US009165381B2

(12) United States Patent
Latta et al.

(10) Patent No.: US 9,165,381 B2
(45) Date of Patent: Oct. 20, 2015

(54) AUGMENTED BOOKS IN A MIXED REALITY ENVIRONMENT

(75) Inventors: Stephen G. Latta, Seattle, WA (US); Ryan L. Hastings, Seattle, WA (US); Cameron G. Brown, Redmond, WA (US); Aaron Krauss, Snoqualmie, WA (US); Daniel J. McCulloch, Kirkland, WA (US); Ben J. Sugden, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 195 days.

(21) Appl. No.: 13/485,627

(22) Filed: May 31, 2012

(65) Prior Publication Data

US 2013/0321390 A1    Dec. 5, 2013

(51) Int. Cl.
| | |
|---|---|
| *G06T 15/00* | (2011.01) |
| *G09G 5/00* | (2006.01) |
| *G06T 11/00* | (2006.01) |
| *G06T 19/00* | (2011.01) |
| *G06F 17/30* | (2006.01) |
| *G06F 1/16* | (2006.01) |
| *G06F 3/01* | (2006.01) |
| *G06F 3/147* | (2006.01) |
| *G10L 15/26* | (2006.01) |

(52) U.S. Cl.
CPC ............... *G06T 11/00* (2013.01); *G06F 1/163* (2013.01); *G06F 3/011* (2013.01); *G06F 3/147* (2013.01); *G06F 17/30696* (2013.01); *G06F 17/30991* (2013.01); *G06T 19/006* (2013.01); *G09G 2380/14* (2013.01); *G10L 15/26* (2013.01)

(58) Field of Classification Search
CPC ... G06F 1/163; G06F 3/033; G06F 17/30696; G06F 17/30991; H04N 1/00244; G06T 15/00; G06T 19/006; G06T 19/00; G06K 9/20; G09G 5/00; G10L 15/26
See application file for complete search history.

(56) References Cited

U.S. PATENT DOCUMENTS

| | | | |
|---|---|---|---|
| 5,954,515 | A | 9/1999 | Iggulden |
| 6,175,343 | B1 | 1/2001 | Mitchell et al. |
| 6,266,057 | B1 | 7/2001 | Kuzunuki et al. |
| 6,408,257 | B1 | 6/2002 | Harrington et al. |
| 6,427,140 | B1 | 7/2002 | Ginter et al. |
| 6,457,024 | B1 | 9/2002 | Felsentein et al. |

(Continued)

FOREIGN PATENT DOCUMENTS

| | | |
|---|---|---|
| CN | 1568453 | 1/2005 |
| CN | 102142005 | 8/2011 |

(Continued)

OTHER PUBLICATIONS

Park et al., KR-1020100067155 machine translation.*

(Continued)

*Primary Examiner* — Sing-Wai Wu
(74) *Attorney, Agent, or Firm* — Judy Yee; Micky Minhas

(57) ABSTRACT

A system and method are disclosed for augmenting a reading experience in a mixed reality environment. In response to predefined verbal or physical gestures, the mixed reality system is able to answer a user's questions or provide additional information relating to what the user is reading. Responses may be displayed to the user on virtual display slates in a border or around the reading material without obscuring text or interfering with the user's reading experience.

14 Claims, 16 Drawing Sheets

(56) References Cited

U.S. PATENT DOCUMENTS

| | | |
|---|---|---|
| 6,466,975 B1 | 10/2002 | Sterling |
| 6,788,293 B1 | 9/2004 | Silverbrook et al. |
| 6,947,219 B1 | 9/2005 | Ou |
| 7,289,130 B1 | 10/2007 | Satoh et al. |
| 7,372,451 B2 | 5/2008 | Dempski |
| 7,509,570 B2 | 3/2009 | Narusawa |
| 7,774,075 B2 | 8/2010 | Lin |
| 7,837,094 B2 | 11/2010 | Rhoads |
| 7,848,573 B2 | 12/2010 | Wecker et al. |
| 7,969,383 B2 | 6/2011 | Eberl et al. |
| 2003/0043144 A1 | 3/2003 | Pundarika et al. |
| 2003/0059762 A1 | 3/2003 | Fujiwara et al. |
| 2004/0008368 A1 | 1/2004 | Plunkett et al. |
| 2004/0104935 A1 | 6/2004 | Williamson et al. |
| 2005/0143172 A1 | 6/2005 | Kurzweil |
| 2006/0028400 A1 | 2/2006 | Lapstun et al. |
| 2006/0122905 A1 | 6/2006 | Marshall et al. |
| 2006/0141436 A1 | 6/2006 | Rines |
| 2006/0150848 A1 | 7/2006 | Deutsch |
| 2006/0244677 A1 | 11/2006 | Dempski |
| 2007/0005795 A1 | 1/2007 | Gonzalez |
| 2007/0093169 A1 | 4/2007 | Blaszczyk et al. |
| 2007/0104036 A1 | 5/2007 | Prax et al. |
| 2007/0157080 A1 | 7/2007 | Wadsworth et al. |
| 2007/0226321 A1 | 9/2007 | Bengtson |
| 2007/0285338 A1 | 12/2007 | Yanagisawa |
| 2008/0266323 A1 | 10/2008 | Biocca et al. |
| 2009/0243967 A1 | 10/2009 | Kato |
| 2009/0243968 A1 | 10/2009 | Nakazawa |
| 2010/0048242 A1 | 2/2010 | Rhoads et al. |
| 2010/0111405 A1 | 5/2010 | Lee et al. |
| 2010/0149073 A1 | 6/2010 | Chaum et al. |
| 2010/0199232 A1 | 8/2010 | Mistry et al. |
| 2010/0208302 A1 | 8/2010 | Lee |
| 2011/0018903 A1 | 1/2011 | Lapstun et al. |
| 2011/0029443 A1 | 2/2011 | King et al. |
| 2011/0081867 A1 | 4/2011 | Issa et al. |
| 2011/0096401 A1 | 4/2011 | Levola |
| 2011/0141511 A1 | 6/2011 | Milanski et al. |
| 2011/0148924 A1 | 6/2011 | Tapley et al. |
| 2011/0167350 A1 | 7/2011 | Hoellwarth |
| 2011/0181497 A1 | 7/2011 | Raviv |
| 2011/0187744 A1 | 8/2011 | Kim et al. |
| 2011/0195388 A1 | 8/2011 | Henshall et al. |
| 2011/0205148 A1 | 8/2011 | Corriveau et al. |
| 2011/0213664 A1 | 9/2011 | Osterhout et al. |
| 2011/0216091 A1 | 9/2011 | Song et al. |
| 2011/0261030 A1 | 10/2011 | Bullock |
| 2011/0279479 A1 | 11/2011 | Rodriguez |
| 2011/0288964 A1 | 11/2011 | Linder et al. |
| 2011/0316806 A1 | 12/2011 | Lapstun et al. |
| 2012/0001923 A1 | 1/2012 | Weinzimmer et al. |
| 2012/0064204 A1 | 3/2012 | Davila et al. |
| 2012/0088543 A1* | 4/2012 | Lindner et al. ............. 455/556.1 |
| 2012/0154557 A1 | 6/2012 | Perez et al. |
| 2012/0188148 A1 | 7/2012 | DeJong |
| 2012/0188279 A1 | 7/2012 | Demaine |
| 2012/0249831 A1* | 10/2012 | Porter ........................ 348/231.3 |
| 2012/0320092 A1 | 12/2012 | Shin et al. |
| 2012/0324493 A1 | 12/2012 | Holmdahl et al. |
| 2013/0016102 A1 | 1/2013 | Look et al. |
| 2013/0044128 A1 | 2/2013 | Liu et al. |
| 2013/0044129 A1 | 2/2013 | Latta et al. |
| 2013/0044130 A1 | 2/2013 | Geisner et al. |
| 2013/0046616 A1 | 2/2013 | Williams et al. |
| 2013/0050432 A1 | 2/2013 | Perez et al. |
| 2013/0054576 A1 | 2/2013 | Karmarkar et al. |
| 2013/0057891 A1 | 3/2013 | Aoki |
| 2013/0076788 A1 | 3/2013 | Zvi |
| 2013/0083003 A1 | 4/2013 | Perez et al. |
| 2013/0083333 A1 | 4/2013 | Lopez et al. |
| 2013/0169682 A1 | 7/2013 | Novak et al. |
| 2013/0235347 A1 | 9/2013 | Hennessey et al. |
| 2013/0298030 A1 | 11/2013 | Nahumi et al. |

FOREIGN PATENT DOCUMENTS

| | | |
|---|---|---|
| EP | 1060772 | 12/2000 |
| JP | 07177442 | 7/1995 |
| JP | 2001154637 | 6/2001 |
| JP | 2004133784 | 4/2004 |
| JP | 2007200261 | 8/2007 |
| JP | 2007214964 | 8/2007 |
| KR | 20000032647 | 6/2000 |
| KR | 20090036183 | 4/2009 |
| KR | 20090060421 | 6/2009 |
| WO | 0167214 | 9/2001 |

OTHER PUBLICATIONS

Bell et al., "View Management for Virtual and Augmented Reality," UIST 2001, Orlando, FL, Nov. 11-14, 2001, pp. 101-110.*
Veltman, Kim H., "Augmented Books, Knowledge, and Culture", In Proceedings of INET'2000, Jul. 2000, 93 pages.
Office Action dated Oct. 23, 2013 in U.S. Appl. No. 13/347,576.
Office Action dated Nov. 5, 2013 in U.S. Appl. No. 13/313,368.
Office Action dated Nov. 7, 2013 in U.S. Appl. No. 13/346,674.
English Abstract for JP2004133784 published Apr. 30, 2004.
Liarokapis, Fotis, "An Augmented Reality Interface for Visualizing and Interacting with Virtual Content", Draft Paper to Appear in Journal of Virtual Reality, vol. 11, Issue 1, Feb. 2007, 18 pages.
International Search Report and Written Opinion dated Mar. 18, 2013 in International Patent Application No. PCT/US2012/067647, 8 pages.
English abstract for JP2007200261 published Aug. 9, 2007.
International Search Report and Written Opinion dated Mar. 22, 2013 in International Patent Application No. PCT/US2012/067805, 7 pages.
English abstract for KR20000032647 published Jun. 15, 2000.
English abstract for KR20090036183 published Apr. 14, 2009.
International Search Report and Written Opinion dated Mar. 22, 2013 in International Patent Application No. PCT/US2012/067806, 7 pages.
English abstract for JP07177442 published Jul. 14, 1995.
English abstract for JP2001154637 published Jun. 8, 2001.
English abstract for JP2007214964 published Aug. 23, 2007.
English abstract for KR20090060421 published Jun. 12, 2009.
Asai, et al., "Augmented Instructions—A Fusion of Augmented Reality and Printed Learning Materials", Proceedings of the Fifth IEEE International Conference on Advanced Learning Technologies, IEEE Computer Society, Jul. 5-8, 2005, pp. 213-215. 3 pages.
Biggs, John, "CMU Researchers Turn Any Surface Into a Touchscreen," TechCrunch [online], Oct. 17, 2011 [retrieved on Oct. 21, 2011], Retrieved from the Internet: <URL:http://techcrunch.com/2011/10/17/cmu-researchers-turn-any-surface-into-a-touchscreen/>, 6 pages.
Billinghurst et al., "MagicBook: Transitioning between Reality and Virtuality," Proceedings of the 2001 Conference on Human Factors in Computing Systems (CHI '01), Mar. 31-Apr. 5, 2001, Seattle, WA, USA. 2 pages.
Card, et al., "3Book: A Scalable 3D Virtual Book," Proceedings of the 2004 Conference on Human Factors in Computing Systems (CHI '04), Apr. 24-29, 2004, in Vienna, Austria, ACM, 4 pages.
Dachselt, et al., "Interacting with Printed Books Using Digital Pens and Smart Mobile Projection," Proceedings of the Workshop on Mobile and Personal Projection (MP²) (CHI '11), ACM, Vancouver, Canada, May 7-12, 2011, 5 pages.
Grasset, et al., "Edutainment with a Mixed Reality Book: A Visually Augmented Illustrative Childrens' Book," Proceedings of the International Conference on Advances in Computer Entertainment Technology, 2008, pp. 292-295, 4 pages.
Grasset, et al., "The Design of a Mixed-Reality Book: Is It Still a Real Book?," Proceedings of the 7th IEEE/ACM International Symposium on Mixed and Augmented Reality, Sep. 15-18, 2008, pp. 99-102, 4 pages.
Hanheide, Marc, "A Cognitive Ego-Vision System for Interactive Assistance", Bielefeld University, Oct. 2006, 198 pages.

(56) References Cited

OTHER PUBLICATIONS

Hong, et al., "Annotating 3D Electronic Books," Proceedings of the Conference on Human Factors in Computing Systems (CHI '05), Apr. 2-7, 2005, in Portland, Oregon, ACM, 4 pages.
Weibel et al., "PaperProof: A Paper-Digital Proof-Editing System," Proceedings of the 2008 Conference on Human Factors in Computing Systems (CHI '08), Apr. 5-10, 2008, Florence, Italy, 13 pages.
Wu, et al., "Turning a Page on the Digital Annotation of Physical Books," Proceedings of the 2nd International Conference on Tangible and Embedded Interaction, Feb. 18-20, 2008, Bonn, Germany, ACM, 8 pages.
U.S. Appl. No.: 13/313,368, filed Dec. 7, 2011.
U.S. Appl. No.: 13/346,674, filed Jan. 9, 2012.
U.S. Appl. No. 13/347,576, filed Jan. 10, 2012.
Response to Office Action filed Mar. 23, 2014 in U.S. Appl. No. 13/347,576.
Response to Office Action filed May 5, 2014 in U.S. Appl. No. 13/313,368.
Response to Office Action filed Mar. 7, 2014 in U.S. Appl. No. 13/346,674.
Office Action dated Jun. 2, 2014 in U.S. Appl. No. 13/346,674.
Office Action dated Jun. 3, 2014 in U.S. Appl. No. 13/347,576.
Office Action filed Jul. 14, 2014 in U.S. Appl. No. 13/313,368.
Notice of Allowance and Fee(s) Due dated Jan. 30, 2015 in U.S. Appl. No. 13/347,576.
Notice of Allowance and Fee(s) Due dated Feb. 5, 2015 in U.S. Appl. No. 13/313,368.
Response to Office Action filed Oct. 14, 2014 in U.S. Appl. No. 13/313,368.
Notice of Allowance dated Nov. 7, 2014 in U.S. Appl. No. 13/313,368.
Response to Final Office Action filed Dec. 1, 2014 in U.S. Appl. No. 13/346,674.
Response to Final Office Action filed Dec. 2, 2014 in U.S. Appl. No. 13/347,576.
Office Action dated Jan. 5, 2015 in U.S. Appl. No. 13/346,674.
"First Office Action and Search Report Issued in Chinese Patent Application No. 201210526353.6", with partial English translation, Mailed Date: Apr. 3, 2015, 17 Pages.
"First Office Action and Search Report Issued in Chinese Patent Application No. 201210525621.2", with partial English translation, Mailed Date: Apr. 3, 2015, 18 Pages.
Response Office Action filed Apr. 6, 2015 in U.S. Appl. No. 13/346,674.
First Office Action and Search Report, with partial English translation, dated May 5, 2015 in Chinese Patent Application No. 201210520999.3.
Final Office Action dated May 27, 2015 in U.S. Appl. No. 13/346,674.
Notice of Allowance and Fee(s) Due dated May 27, 2015 in U.S. Appl. No. 13/347,576.
Response to Final Office Action filed Jul. 23, 2015 in U.S. Appl. No. 13/346,674.
Notice of Allowance and Fee(s) Due dated Aug. 28, 2015 in U.S. Appl. No. 13/346,674.
Response to First Office Action, and partial English translation, filed Aug. 14, 2015 in Chinese Patent Application No. 2012105256212.

\* cited by examiner

Fig. 10
(Step 608)
Fig. 11
(Step 614)
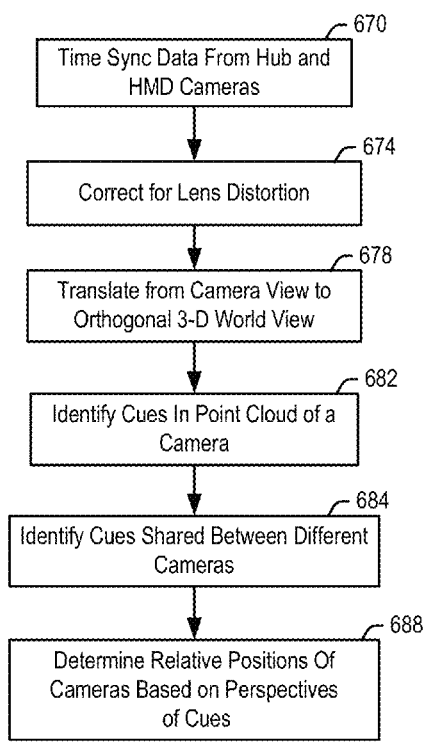
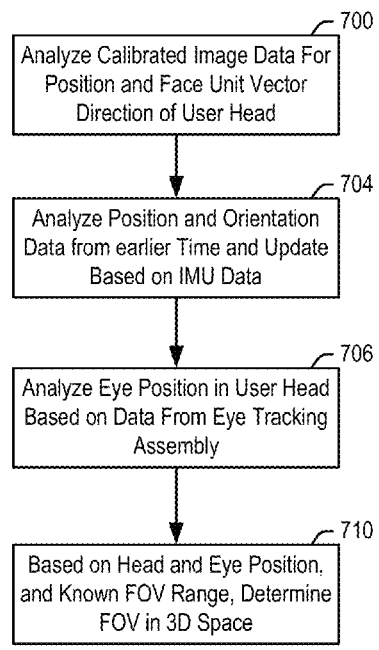

*(Step 622)*

(Step 646)

(Step 812)

AUGMENTED BOOKS IN A MIXED REALITY ENVIRONMENT

BACKGROUND

Mixed reality is a technology that allows virtual imagery to be fused with a real setting and real objects to produce a new environment where a user can see both physical and virtual objects in real time. A see-through, head mounted, mixed reality display device may be worn by a user to view the mixed imagery of real objects and virtual objects displayed in the user's field of view. A user may further interact with virtual objects, for example by performing hand or voice gestures to move the objects, alter their appearance or simply view them.

Conventionally, there has been little or no focus on the potential synergy of combining a mixed reality environment with book reading. When reading a real book, or an EBook presented over an electronic device, a user may have questions about the content of the book. Answering these questions typically requires either going to an electronic device if users are reading traditional books, or going to another program when reading an EBook. Typically when reading an EBook, the extra information obscures or even replaces the text the user is reading, requiring the user to switch back and forth between their book and the extra data. When reading a traditional book, the user must go retrieve another device and type in the data they are searching for.

SUMMARY

Embodiments of the present technology relate to a system and method for augmenting a reading experience in a mixed reality environment. A system for creating a mixed reality environment in general includes a see-through, head mounted display device coupled to one or more processing units. The processing units in cooperation with the head mounted display unit(s) are able to discern a book or other literature being read by a user, and where on a page the user is looking. The mixed reality system is also able to add text, graphics and/or video on a virtual display slate around a border of the text, or outside of an outline of the book.

Using these features, the mixed reality system is able to augment the user's reading experience. In response to predefined verbal or physical gestures, the mixed reality system is able to answer a user's questions or provide additional information relating to what the user is reading. As one example, a user can ask the meaning of a word the user is focused on. The system is able to identify where the user is looking, and the system is able to access a dictionary, stored locally or on the World Wide Web, and provide the definition to the user on a virtual display slate. The user may query the system for a wide variety of other information, such as for example character history, relationships and maps. This information may be displayed to the user on virtual display slates in a border or around the book without obscuring the book text or interfering with the user's reading experience. The user may also add notes and metadata to a book, which information may be saved in association with a particular point in a book for later access.

In an example, the present technology relates to a system for presenting a mixed reality experience to one or more users, the system comprising: a display device for a user of the one or more users, the display device including a display unit for displaying a virtual image to the user of the display device; and a computing system operatively coupled to the display device, the computing system generating the virtual image for display on the display device, the virtual image added in relation to reading material the user is reading or an image the user is viewing.

In another example, the present technology relates to a method of presenting a mixed reality experience to a user viewing a reading material including text and/or an image, the method comprising: (a) receiving a request for information regarding a portion of the reading material; (b) searching for a response to the request for information received in said step (a); (c) formatting a virtual object for displaying content with the response if a response is found in said step (b); and (d) displaying the virtual object to a user at a position in the user's field of view that does not overlap with text and or images from the reading material.

In a further example, the present technology relates to a method of presenting a mixed reality experience to a user viewing a reading material including text and/or an image, the method comprising: (a) identifying a position of the reading material in three-dimensional space; (b) tracking a position of a user's eyes with respect to text or images in the reading material; (c) receiving a request for information regarding a portion of the reading material; (d) searching for a response to the request for information received in said step (a); (e) displaying the response to a user, if found in said step (d), in a virtual display slate at a position in the user's field of view that does not overlap with text and or images from the reading material; and (f) pinning the position of the virtual display slate in a fixed position with respect to the reading material in the user's field of view.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 10-14A are more detailed flowcharts of examples of various steps shown in the flowchart of FIG. 9.

FIG. 17 is an illustration of an example of a mixed reality environment including a display of virtual display slates augmenting an electronic device that the user is working with.

DETAILED DESCRIPTION

Figure 1:
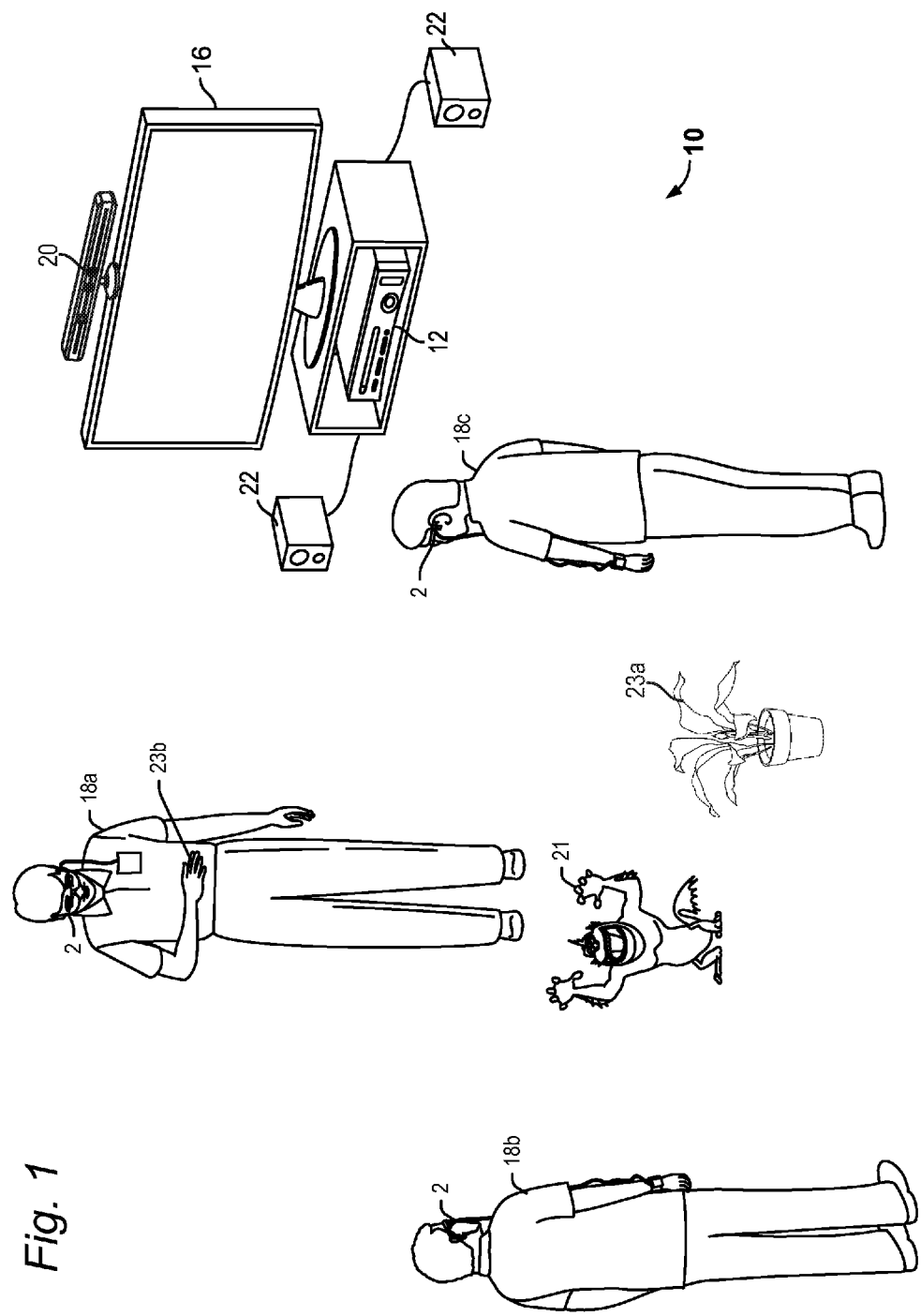
FIG. 1 is an illustration of example components of one embodiment of a system for presenting a mixed reality environment to one or more users.

Embodiments of the present technology will now be described with reference to FIGS. 1-17, which in general relate to augmenting a reading experience in a mixed reality environment. The system for implementing the mixed reality environment includes a mobile display device communicating with a hub computing system. The mobile display device may include a mobile processing unit coupled to a head mounted display device (or other suitable apparatus) having a display element.

Each user wears a head mounted display device including a display element. The display element is to a degree transparent so that a user can look through the display element at real world objects within the user's field of view (FOV). The display element also provides the ability to project virtual images into the FOV of the user such that the virtual images may also appear alongside the real world objects. The system automatically tracks where the user is looking so that the system can determine where to insert the virtual image in the FOV of the user. Once the system knows where to project the virtual image, the image is projected using the display element.

In embodiments, the hub computing system and one or more of the processing units may cooperate to build a model of the environment including the x, y, z Cartesian positions of all users, real world objects and virtual three-dimensional objects in the room or other environment. The positions of each head mounted display device worn by the users in the environment may be calibrated to the model of the environment and to each other. This allows the system to determine each user's line of sight and FOV of the environment. Thus, a virtual image may be displayed to each user, but the system determines the display of the virtual image from each user's perspective, adjusting the virtual image for parallax and any occlusions from or by other objects in the environment. The model of the environment, referred to herein as a scene map, as well as all tracking of the user's FOV and objects in the environment may be generated by the hub and computing devices working in tandem or individually.

Embodiments of the mixed reality system described below are used to augment a reading experience. As used herein, the term "reading material" refers to any media including text, such as but not limited to books, periodicals, documents, newspapers, maps, labels and packaging, chalk boards and white boards, signs, scrolls, pamphlets, posters, envelopes, written letters and emails. Instead of reading, a user may be looking at an image, which, as used herein, may include but is not limited to graphics, pictures, paintings, drawings and photographs. An image may be static, or it may be dynamic as in the case of a video. Reading material may include both text and images in embodiments.

Reading material and images may be tangible, i.e., text/images on a page, which are referred to herein as "tangible reading material" and "tangible images." Reading material and images may alternatively be displayed on a monitor of an electronic device, referred to herein as "electronic reading material" and "electronic images." As explained below, reading material and images may also be provided as virtual, or holographic, objects via the mixed reality system.

A user may choose to interact with reading material or images. As used herein, the term "interact" encompasses both physical interaction and verbal interaction of a user with reading material, images or other real or virtual objects. Physical interaction includes a user performing a predefined gesture using his or her fingers, hand and/or other body part(s) recognized by the mixed reality system as a user-request for the system to perform a predefined action. Such predefined gestures may include but are not limited to pointing at a specific location within a reading material or image.

A user may also physically interact with reading material/images with his or her eyes. In some instances, eye gaze data identifies where a user is focusing within a reading material or image, and can thus identify that a user is looking at a particular word or portion of an image. Sustained eye gaze, or a blink or blink sequence, may thus be a physical interaction whereby a user selects a word, phrase, image or portion of an image. A user simply looking at a text or an image is a further example of physical interaction of a user with media.

A user may alternatively or additionally interact with reading material or images using verbal gestures, such as for example a spoken word or phrase recognized by the mixed reality system as a user request for the system to perform a predefined action. Verbal gestures may be used in conjunction with physical gestures to interact with reading material, images and/or virtual objects in the mixed reality environment.

In accordance with the present technology, a person may augment their experience with reading materials and images using a mixed reality system. As explained below, the system is able to identify the position of a reading material or image in three-dimensional space. The system is also able to track where a user's eyes are looking, and in embodiments, specifically which text or portions of an image the user is looking at. Thus, a user is able to select a specific word, phrase, image or portion of an image, either by simply looking at the text or image, pointing at the text or image, or verbally speaking the text.

The system is further able to identify physical or verbal gestures, and associate those gestures with a selected text or image. In this way, the user may query the system using predefined gestures to retrieve information relating to selected text, images or portions of images. For example, a user may query the system as to the meaning, etymology or proper spelling of a selected word. A user may query the system as to the biography of a named person or character, or provide his/her relationship to other people or characters. A user may further request a map with geological details of a story, or a plot summary to that point, without revealing plot details which occur later in the story. In addition to queries, a user may add notes or metadata associated with a specific word, image or location in a reading material, which notes or metadata get saved in association with that word, image or location for later reference. These and other examples are explained in greater detail below.

Upon receiving a physical or verbal gesture to request information in association with a word, phrase or image, the present system then attempts to obtain that information. The information may be stored locally within a memory associated with the hub computing system. For example, a reading material may have an associated software application running on the hub computing system, which software application is provided to supplement the reading material with additional information in response to queries from the user. Additionally or alternatively, upon receipt of a request for additional information, the system may send a query to the World Wide Web, for example accessing online dictionaries or websites such as Wikipedia (www.wikipedia.com).

If the requested information is obtained, the information may be displayed to the user in a way that is unobtrusive and does not interfere with the user's reading or viewing experience. For example, the information may be displayed on a virtual display slate above, below or to the sides of the reading material or image, with a line or arrow to the referenced text or image. Examples of this are explained in greater detail below.

Figure 2:
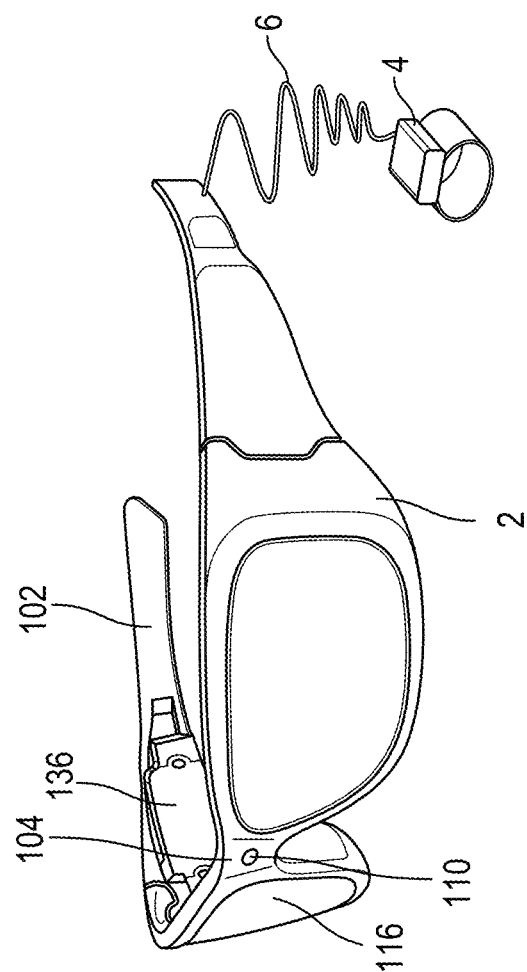
FIG. 2 is a perspective view of one embodiment of a head mounted display unit.
Figure 3:
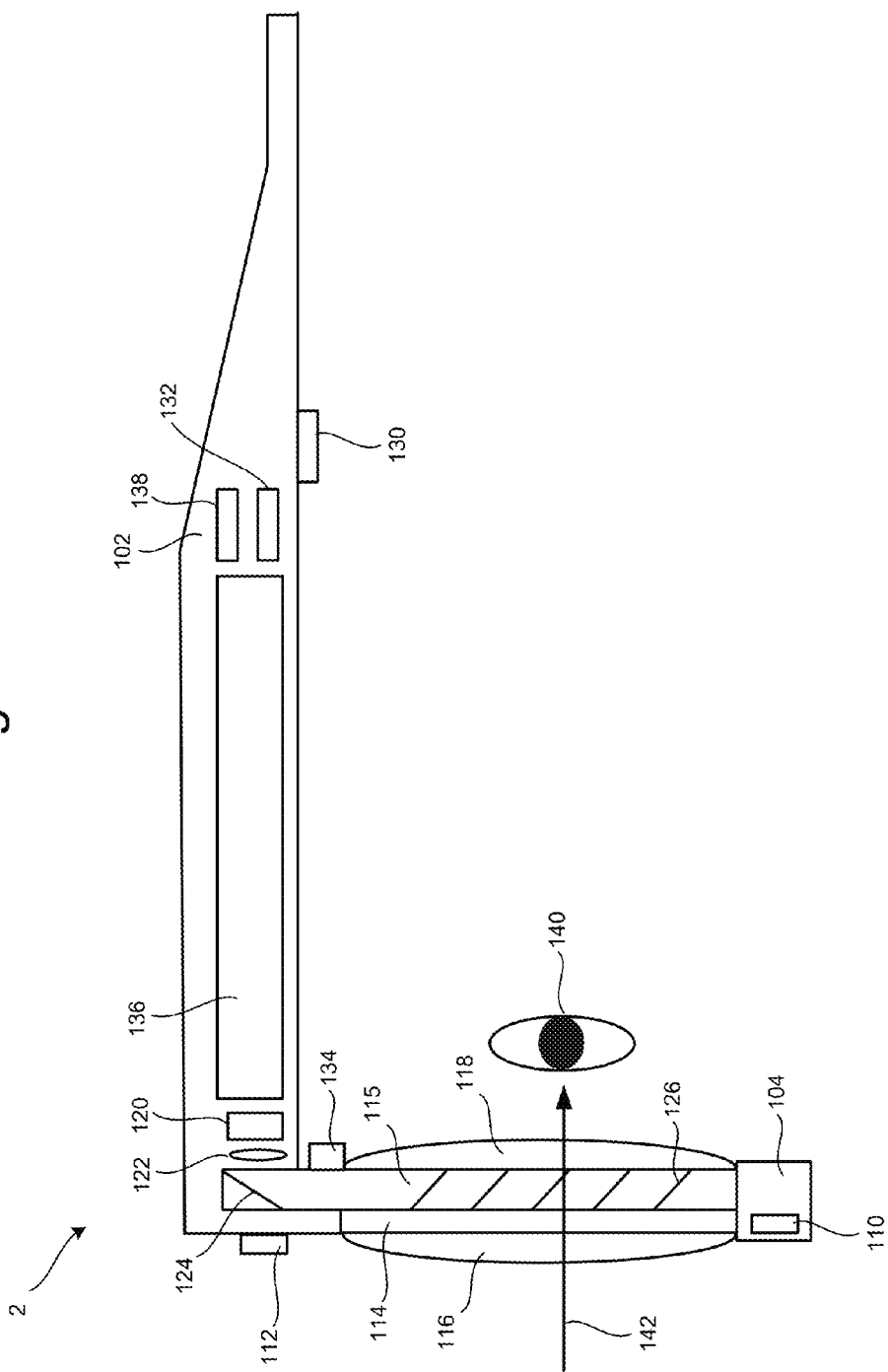
FIG. 3 is a side view of a portion of one embodiment of a head mounted display unit.

FIG. 1 illustrates a system 10 for providing a mixed reality experience by fusing virtual content 22 into real content 23 within a user's FOV. FIG. 1 shows a number of users 18a, 18b and 18c each wearing a head mounted display device 2. As seen in FIGS. 2 and 3, each head mounted display device 2 is in communication with its own processing unit 4 via wire 6. In other embodiments, head mounted display device 2 communicates with processing unit 4 via wireless communication. Head mounted display device 2, which in one embodiment is in the shape of glasses, is worn on the head of a user so that the user can see through a display and thereby have an actual direct view of the space in front of the user. The use of the term "actual direct view" refers to the ability to see the real world objects directly with the human eye, rather than seeing created image representations of the objects. For example, looking through glass at a room allows a user to have an actual direct view of the room, while viewing a video of a room on a television is not an actual direct view of the room. More details of the head mounted display device 2 are provided below.

In one embodiment, processing unit 4 is a small, portable device for example worn on the user's wrist or stored within a user's pocket. The processing unit may for example be the size and form factor of a cellular telephone, though it may be other shapes and sizes in further examples. The processing unit 4 may include much of the computing power used to operate head mounted display device 2. In embodiments, the processing unit 4 communicates wirelessly (e.g., WiFi, Bluetooth, infra-red, or other wireless communication means) to one or more hub computing systems 12. As explained hereinafter, hub computing system 12 may be omitted in further embodiments to provide a completely mobile mixed reality experience using only the head mounted displays and processing units 4.

Hub computing system 12 may be a computer, a gaming system or console, or the like. According to an example embodiment, the hub computing system 12 may include hardware components and/or software components such that hub computing system 12 may be used to execute applications such as gaming applications, non-gaming applications, or the like. In one embodiment, hub computing system 12 may include a processor such as a standardized processor, a specialized processor, a microprocessor, or the like that may execute instructions stored on a processor readable storage device for performing the processes described herein.

Hub computing system 12 further includes a capture device 20 for capturing image data from portions of a scene within its FOV. As used herein, a scene is the environment in which the users move around, which environment is captured within the FOV of the capture device 20 and/or the FOV of each head mounted display device 2. FIG. 1 shows a single capture device 20, but there may be multiple capture devices in further embodiments which cooperate to collectively capture image data from a scene within the composite FOVs of the multiple capture devices 20. Capture device 20 may include one or more cameras that visually monitor the one or more users 18a, 18b, 18c and the surrounding space such that gestures and/or movements performed by the one or more users, as well as the structure of the surrounding space, may be captured, analyzed, and tracked to perform one or more controls or actions within the application and/or animate an avatar or on-screen character.

Hub computing system 12 may be connected to an audiovisual device 16 such as a television, a monitor, a high-definition television (HDTV), or the like that may provide game or application visuals. For example, hub computing system 12 may include a video adapter such as a graphics card and/or an audio adapter such as a sound card that may provide audiovisual signals associated with the game application, non-game application, etc. The audiovisual device 16 may receive the audiovisual signals from hub computing system 12 and may then output the game or application visuals and/or audio associated with the audiovisual signals. According to one embodiment, the audiovisual device 16 may be connected to hub computing system 12 via, for example, an S-Video cable, a coaxial cable, an HDMI cable, a DVI cable, a VGA cable, a component video cable, RCA cables, etc. In one example, audiovisual device 16 includes internal speakers. In other embodiments, audiovisual device 16 and hub computing system 12 may be connected to external speakers 22.

Hub computing system 12, with capture device 20, may be used to recognize, analyze, and/or track human (and other types of) targets. For example, one or more of the users 18a, 18b and 18c wearing head mounted display devices 2 may be tracked using the capture device 20 such that the gestures and/or movements of the users may be captured to animate one or more avatars or on-screen characters. The movements may also or alternatively be interpreted as controls that may be used to affect the application being executed by hub computing system 12. The hub computing system 12, together with the head mounted display devices 2 and processing units 4, may also together provide a mixed reality experience where one or more virtual images, such as virtual image 21 in FIG. 1, may be mixed together with real world objects in a scene. FIG. 1 illustrates examples of real world objects 23, including a plant 23a or a user's hand 23b appearing within the user's FOV.

FIGS. 2 and 3 show perspective and side views of the head mounted display device 2. FIG. 3 shows only the right side of head mounted display device 2, including a portion of the device having temple 102 and nose bridge 104. Built into nose bridge 104 is a microphone 110 for recording sounds and transmitting that audio data to processing unit 4, as described below. At the front of head mounted display device 2 is room-facing video camera 112 that can capture video and still images. Those images are transmitted to processing unit 4, as described below.

A portion of the frame of head mounted display device 2 will surround a display (that includes one or more lenses). In order to show the components of head mounted display device 2, a portion of the frame surrounding the display is not depicted. The display includes a light-guide optical element 115, opacity filter 114, see-through lens 116 and see-through lens 118. In one embodiment, opacity filter 114 is behind and aligned with see-through lens 116, light-guide optical element 115 is behind and aligned with opacity filter 114, and see-through lens 118 is behind and aligned with light-guide optical element 115. See-through lenses 116 and 118 are standard lenses used in eye glasses and can be made to any prescription (including no prescription). In one embodiment, see-through lenses 116 and 118 can be replaced by a variable prescription lens. In some embodiments, head mounted display device 2 will include only one see-through lens or no see-through lenses. In another alternative, a prescription lens can go inside light-guide optical element 115. Opacity filter 114 filters out natural light (either on a per pixel basis or uniformly) to enhance the contrast of the virtual imagery. Light-guide optical element 115 channels artificial light to the eye. More details of opacity filter 114 and light-guide optical element 115 are provided below.

Mounted to or inside temple 102 is an image source, which (in one embodiment) includes microdisplay 120 for projecting a virtual image and lens 122 for directing images from microdisplay 120 into light-guide optical element 115. In one embodiment, lens 122 is a collimating lens.

Control circuits 136 provide various electronics that support the other components of head mounted display device 2. More details of control circuits 136 are provided below with respect to FIG. 4. Inside or mounted to temple 102 are ear phones 130, inertial measurement unit 132 and temperature sensor 138. In one embodiment shown in FIG. 4, the inertial measurement unit 132 (or IMU 132) includes inertial sensors such as a three axis magnetometer 132A, three axis gyro 132B and three axis accelerometer 132C. The inertial measurement unit 132 senses position, orientation, and sudden accelerations (pitch, roll and yaw) of head mounted display device 2. The IMU 132 may include other inertial sensors in addition to or instead of magnetometer 132A, gyro 132B and accelerometer 132C.

Microdisplay 120 projects an image through lens 122. There are different image generation technologies that can be used to implement microdisplay 120. For example, microdisplay 120 can be implemented in using a transmissive projection technology where the light source is modulated by optically active material, backlit with white light. These technologies are usually implemented using LCD type displays with powerful backlights and high optical energy densities. Microdisplay 120 can also be implemented using a reflective technology for which external light is reflected and modulated by an optically active material. The illumination is forward lit by either a white source or RGB source, depending on the technology. Digital light processing (DLP), liquid crystal on silicon (LCOS) and Mirasol® display technology from Qualcomm, Inc. are all examples of reflective technologies which are efficient as most energy is reflected away from the modulated structure and may be used in the present system. Additionally, microdisplay 120 can be implemented using an emissive technology where light is generated by the display. For example, a PicoP™ display engine from Microvision, Inc. emits a laser signal with a micro mirror steering either onto a tiny screen that acts as a transmissive element or beamed directly into the eye (e.g., laser).

Light-guide optical element 115 transmits light from microdisplay 120 to the eye 140 of the user wearing head mounted display device 2. Light-guide optical element 115 also allows light from in front of the head mounted display device 2 to be transmitted through light-guide optical element 115 to eye 140, as depicted by arrow 142, thereby allowing the user to have an actual direct view of the space in front of head mounted display device 2 in addition to receiving a virtual image from microdisplay 120. Thus, the walls of light-guide optical element 115 are see-through. Light-guide optical element 115 includes a first reflecting surface 124 (e.g., a mirror or other surface). Light from microdisplay 120 passes through lens 122 and becomes incident on reflecting surface 124. The reflecting surface 124 reflects the incident light from the microdisplay 120 such that light is trapped inside a planar substrate comprising light-guide optical element 115 by internal reflection. After several reflections off the surfaces of the substrate, the trapped light waves reach an array of selectively reflecting surfaces 126. Note that only one of the five surfaces is labeled 126 to prevent over-crowding of the drawing. Reflecting surfaces 126 couple the light waves incident upon those reflecting surfaces out of the substrate into the eye 140 of the user.

As different light rays will travel and bounce off the inside of the substrate at different angles, the different rays will hit the various reflecting surfaces 126 at different angles. Therefore, different light rays will be reflected out of the substrate by different ones of the reflecting surfaces. The selection of which light rays will be reflected out of the substrate by which surface 126 is engineered by selecting an appropriate angle of the surfaces 126. More details of a light-guide optical element can be found in United States Patent Publication No. 2008/0285140, entitled "Substrate-Guided Optical Devices," published on Nov. 20, 2008, incorporated herein by reference in its entirety. In one embodiment, each eye will have its own light-guide optical element 115. When the head mounted display device 2 has two light-guide optical elements, each eye can have its own microdisplay 120 that can display the same image in both eyes or different images in the two eyes. In another embodiment, there can be one light-guide optical element which reflects light into both eyes.

Opacity filter 114, which is aligned with light-guide optical element 115, selectively blocks natural light, either uniformly or on a per-pixel basis, from passing through light-guide optical element 115. Details of an opacity filter such as filter 114 are provided in U.S. Patent Publication No. 2012/0068913 to Bar-Zeev et al., entitled "Opacity Filter For See-Through Mounted Display," filed on Sep. 21, 2010, incorporated herein by reference in its entirety. However, in general, an embodiment of the opacity filter 114 can be a see-through LCD panel, an electrochromic film, or similar device which is capable of serving as an opacity filter. Opacity filter 114 can include a dense grid of pixels, where the light transmissivity of each pixel is individually controllable between minimum and maximum transmissivities. While a transmissivity range of 0-100% is ideal, more limited ranges are also acceptable, such as for example about 50% to 90% per pixel, up to the resolution of the LCD.

A mask of alpha values can be used from a rendering pipeline, after z-buffering with proxies for real-world objects. When the system renders a scene for the augmented reality display, it takes note of which real-world objects are in front of which virtual objects as explained below. If a virtual object is in front of a real-world object, then the opacity may be on for the coverage area of the virtual object. If the virtual object is (virtually) behind a real-world object, then the opacity may be off, as well as any color for that pixel, so the user will only see the real-world object for that corresponding area (a pixel or more in size) of real light. Coverage would be on a pixel-by-pixel basis, so the system could handle the case of part of a virtual object being in front of a real-world object, part of the virtual object being behind the real-world object, and part of the virtual object being coincident with the real-world object. Displays capable of going from 0% to 100% opacity at low cost, power, and weight are the most desirable for this use. Moreover, the opacity filter can be rendered in color, such as with a color LCD or with other displays such as organic LEDs, to provide a wide FOV.

Figure 4:
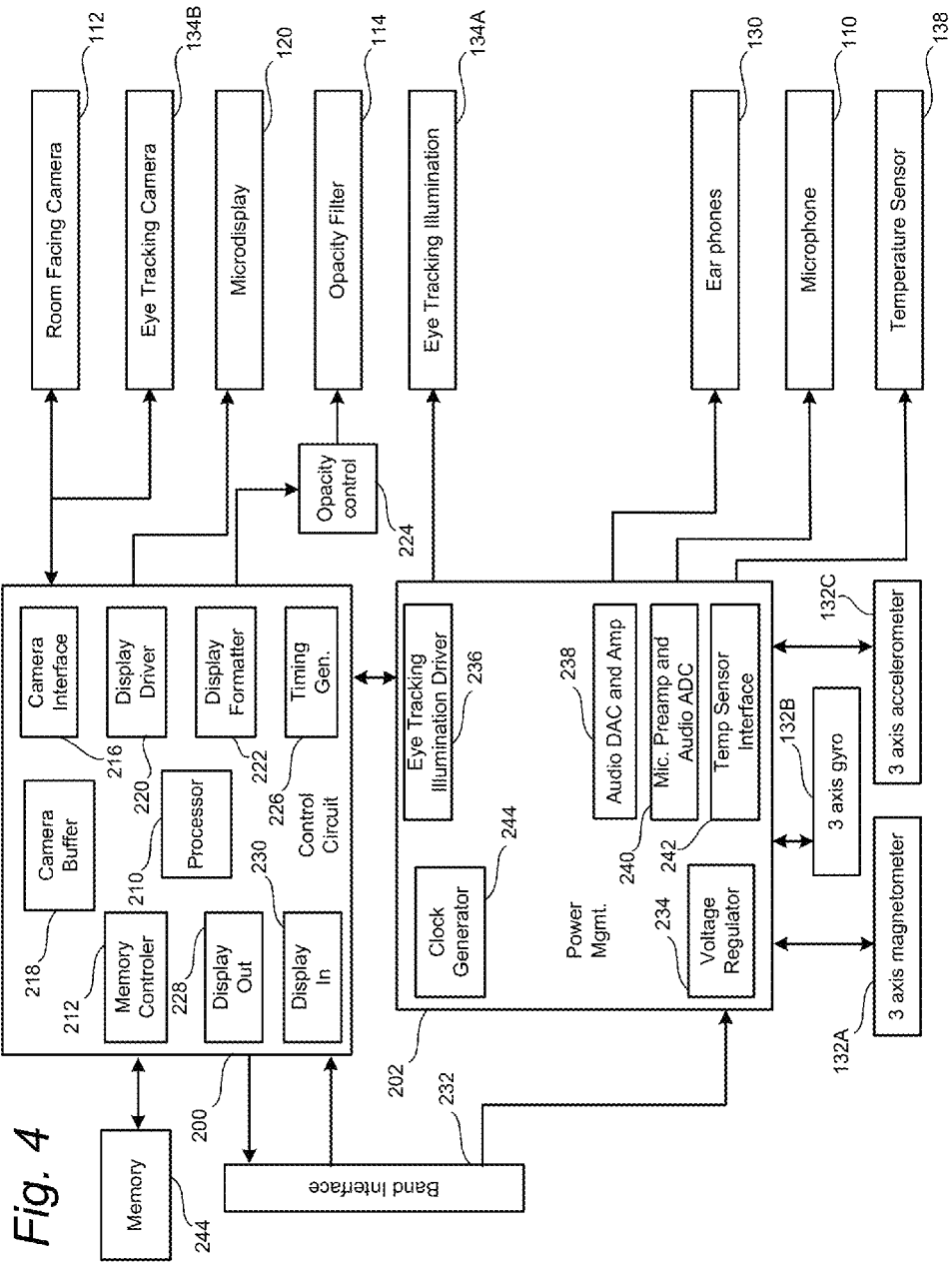
FIG. 4 is a block diagram of one embodiment of the components of a head mounted display unit.

Head mounted display device 2 also includes a system for tracking the position of the user's eyes. As will be explained below, the system will track the user's position and orientation so that the system can determine the FOV of the user. However, a human will not perceive everything in front of them. Instead, a user's eyes will be directed at a subset of the environment. Therefore, in one embodiment, the system will include technology for tracking the position of the user's eyes in order to refine the measurement of the FOV of the user. For example, head mounted display device 2 includes eye tracking assembly 134 (FIG. 3), which has an eye tracking illumination device 134A and eye tracking camera 134B (FIG. 4). In one embodiment, eye tracking illumination device 134A includes one or more infrared (IR) emitters, which emit IR light toward the eye. Eye tracking camera 134B includes one or more cameras that sense the reflected IR light. The position of the pupil can be identified by known imaging techniques which detect the reflection of the cornea. For example, see U.S. Pat. No. 7,401,920, entitled "Head Mounted Eye Tracking and Display System", issued Jul. 22, 2008, incorporated herein by reference. Such a technique can locate a position of the center of the eye relative to the tracking camera. Generally, eye tracking involves obtaining an image of the eye and using computer vision techniques to determine the location of the pupil within the eye socket. In one embodiment, it is sufficient to track the location of one eye since the eyes usually move in unison. However, it is possible to track each eye separately.

In one embodiment, the system will use four IR LEDs and four IR photo detectors in rectangular arrangement so that there is one IR LED and IR photo detector at each corner of the lens of head mounted display device 2. Light from the LEDs reflect off the eyes. The amount of infrared light detected at each of the four IR photo detectors determines the pupil direction. That is, the amount of white versus black in the eye will determine the amount of light reflected off the eye for that particular photo detector. Thus, the photo detector will have a measure of the amount of white or black in the eye. From the four samples, the system can determine the direction of the eye.

Another alternative is to use four infrared LEDs as discussed above, but only one infrared CCD on the side of the lens of head mounted display device 2. The CCD will use a small mirror and/or lens (fish eye) such that the CCD can image up to 75% of the visible eye from the glasses frame. The CCD will then sense an image and use computer vision to find the image, much like as discussed above. Thus, although FIG. 3 shows one assembly with one IR transmitter, the structure of FIG. 3 can be adjusted to have four IR transmitters and/or four IR sensors. More or less than four IR transmitters and/or four IR sensors can also be used.

Another embodiment for tracking the direction of the eyes is based on charge tracking. This concept is based on the observation that a retina carries a measurable positive charge and the cornea has a negative charge. Sensors are mounted by the user's ears (near earphones 130) to detect the electrical potential while the eyes move around and effectively read out what the eyes are doing in real time. Other embodiments for tracking eyes can also be used.

FIG. 3 only shows half of the head mounted display device 2. A full head mounted display device would include another set of see-through lenses, another opacity filter, another light-guide optical element, another microdisplay 120, another lens 122, room-facing camera, eye tracking assembly, micro display, earphones, and temperature sensor.

Figure 5:
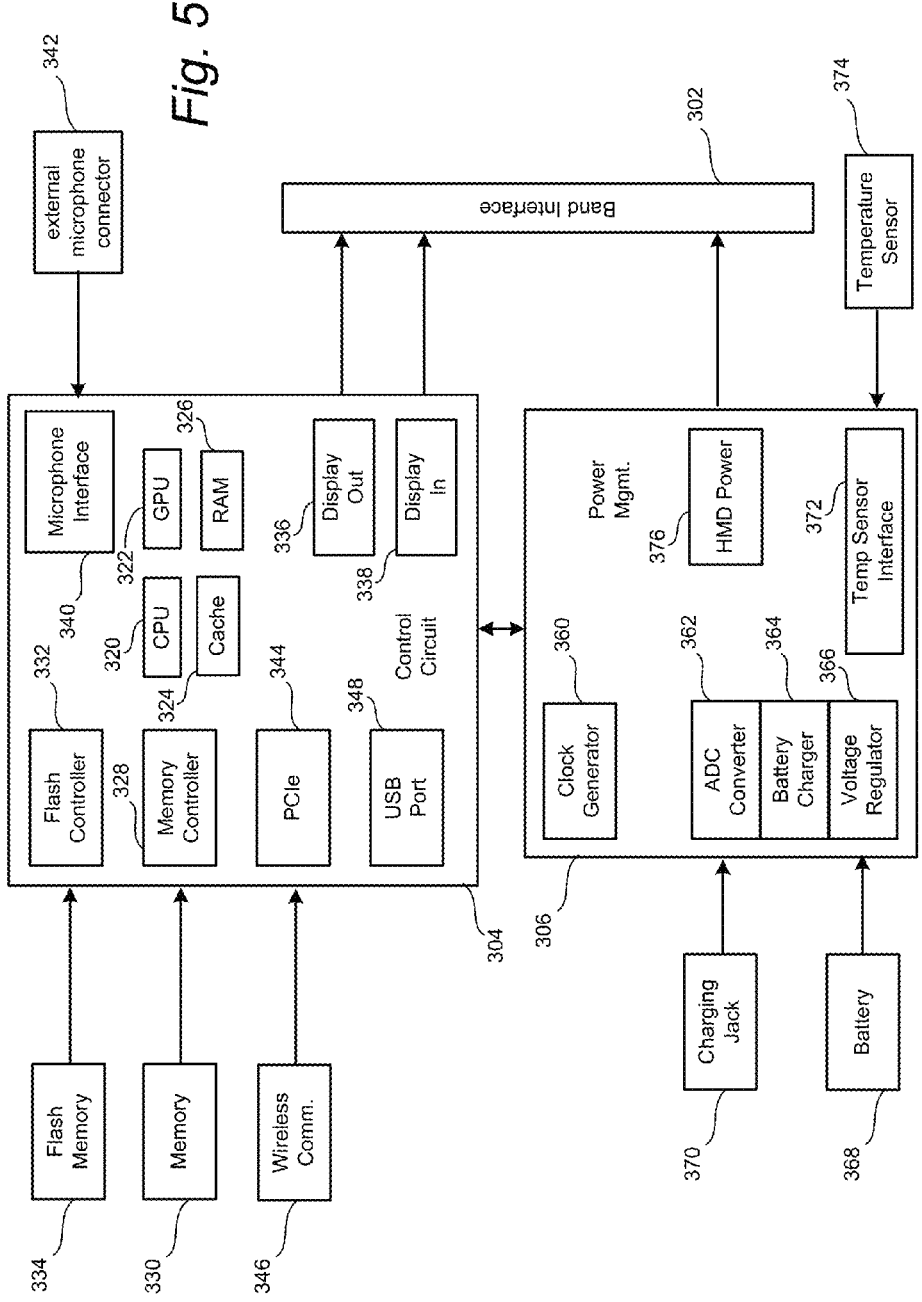
FIG. 5 is a block diagram of one embodiment of the components of a processing unit associated with a head mounted display unit.

FIG. 4 is a block diagram depicting the various components of head mounted display device 2. FIG. 5 is a block diagram describing the various components of processing unit 4. Head mounted display device 2, the components of which are depicted in FIG. 4, is used to provide a mixed reality experience to the user by fusing one or more virtual images seamlessly with the user's view of the real world. Additionally, the head mounted display device components of FIG. 4 include many sensors that track various conditions.

Head mounted display device 2 will receive instructions about the virtual image from processing unit 4 and will provide the sensor information back to processing unit 4. Processing unit 4, the components of which are depicted in FIG. 4, will receive the sensory information from head mounted display device 2 and will exchange information and data with the hub computing system 12 (FIG. 1). Based on that exchange of information and data, processing unit 4 will determine where and when to provide a virtual image to the user and send instructions accordingly to the head mounted display device of FIG. 4.

Some of the components of FIG. 4 (e.g., room-facing camera 112, eye tracking camera 134B, microdisplay 120, opacity filter 114, eye tracking illumination 134A, earphones 130, and temperature sensor 138) are shown in shadow to indicate that there are two of each of those devices, one for the left side and one for the right side of head mounted display device 2. FIG. 4 shows the control circuit 200 in communication with the power management circuit 202. Control circuit 200 includes processor 210, memory controller 212 in communication with memory 214 (e.g., D-RAM), camera interface 216, camera buffer 218, display driver 220, display formatter 222, timing generator 226, display out interface 228, and display in interface 230.

In one embodiment, all of the components of control circuit 200 are in communication with each other via dedicated lines or one or more buses. In another embodiment, each of the components of control circuit 200 is in communication with processor 210. Camera interface 216 provides an interface to the two room-facing cameras 112 and stores images received from the room-facing cameras in camera buffer 218. Display driver 220 will drive microdisplay 120. Display formatter 222 provides information, about the virtual image being displayed on microdisplay 120, to opacity control circuit 224, which controls opacity filter 114. Timing generator 226 is used to provide timing data for the system. Display out interface 228 is a buffer for providing images from room-facing cameras 112 to the processing unit 4. Display in interface 230 is a buffer for receiving images such as a virtual image to be displayed on microdisplay 120. Display out interface 228 and display in interface 230 communicate with band interface 232 which is an interface to processing unit 4.

Power management circuit 202 includes voltage regulator 234, eye tracking illumination driver 236, audio DAC and amplifier 238, microphone preamplifier and audio ADC 240, temperature sensor interface 242 and clock generator 244. Voltage regulator 234 receives power from processing unit 4 via band interface 232 and provides that power to the other components of head mounted display device 2. Eye tracking illumination driver 236 provides the IR light source for eye tracking illumination 134A, as described above. Audio DAC and amplifier 238 output audio information to the earphones 130. Microphone preamplifier and audio ADC 240 provides an interface for microphone 110. Temperature sensor interface 242 is an interface for temperature sensor 138. Power management circuit 202 also provides power and receives data back from three axis magnetometer 132A, three axis gyro 132B and three axis accelerometer 132C.

FIG. 5 is a block diagram describing the various components of processing unit 4. FIG. 5 shows control circuit 304 in communication with power management circuit 306. Control circuit 304 includes a central processing unit (CPU) 320, graphics processing unit (GPU) 322, cache 324, RAM 326, memory controller 328 in communication with memory 330 (e.g., D-RAM), flash memory controller 332 in communication with flash memory 334 (or other type of non-volatile storage), display out buffer 336 in communication with head mounted display device 2 via band interface 302 and band interface 232, display in buffer 338 in communication with head mounted display device 2 via band interface 302 and band interface 232, microphone interface 340 in communication with an external microphone connector 342 for connecting to a microphone, PCI express interface for connecting to a wireless communication device 346, and USB port(s) 348. In one embodiment, wireless communication device 346 can include a Wi-Fi enabled communication device, Blue-Tooth communication device, infrared communication device, etc. The USB port can be used to dock the processing unit 4 to hub computing system 12 in order to load data or software onto processing unit 4, as well as charge processing unit 4. In one embodiment, CPU 320 and GPU 322 are the main workhorses for determining where, when and how to insert virtual three-dimensional objects into the view of the user. More details are provided below.

Power management circuit 306 includes clock generator 360, analog to digital converter 362, battery charger 364, voltage regulator 366, head mounted display power source 376, and temperature sensor interface 372 in communication with temperature sensor 374 (possibly located on the wrist band of processing unit 4). Analog to digital converter 362 is used to monitor the battery voltage, the temperature sensor and control the battery charging function. Voltage regulator 366 is in communication with battery 368 for supplying power to the system. Battery charger 364 is used to charge battery 368 (via voltage regulator 366) upon receiving power from charging jack 370. HMD power source 376 provides power to the head mounted display device 2.

Figure 6:
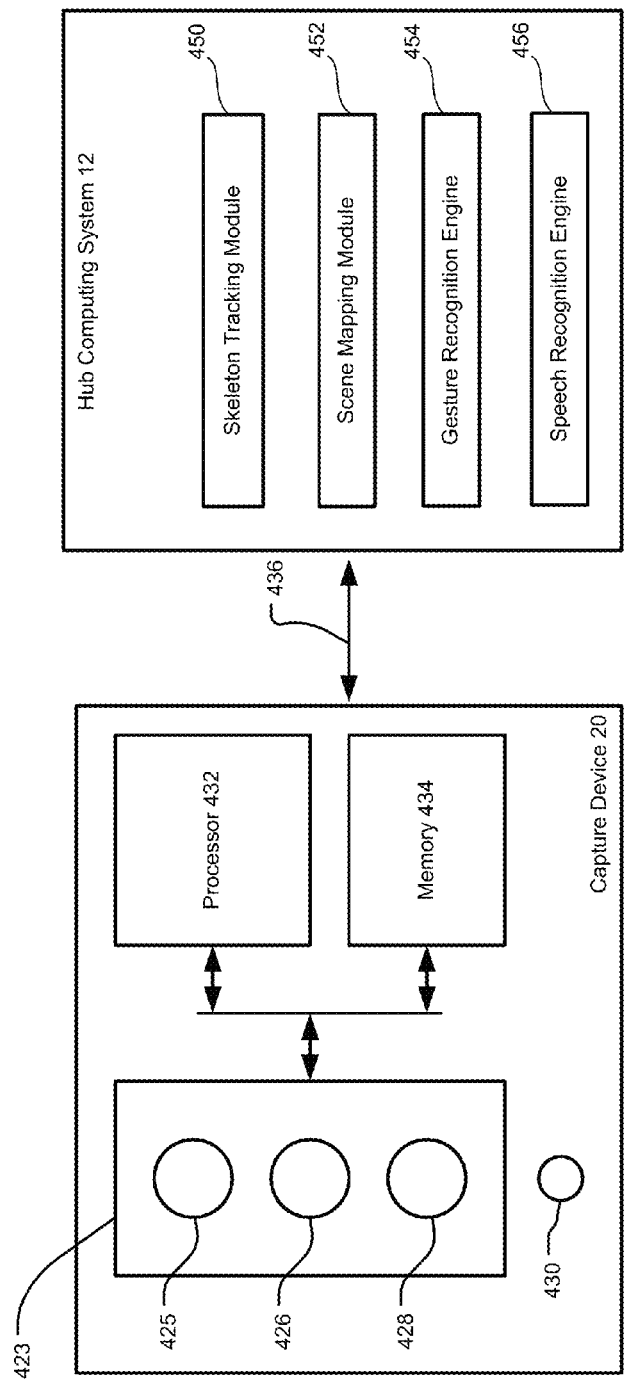
FIG. 6 is a block diagram of one embodiment of the components of a hub computing system used with a head mounted display unit.

FIG. 6 illustrates an example embodiment of hub computing system 12 with a capture device 20. According to an example embodiment, capture device 20 may be configured to capture video with depth information including a depth image that may include depth values via any suitable technique including, for example, time-of-flight, structured light, stereo image, or the like. According to one embodiment, the capture device 20 may organize the depth information into "Z layers," or layers that may be perpendicular to a Z axis extending from the depth camera along its line of sight.

As shown in FIG. 6, capture device 20 may include a camera component 423. According to an example embodiment, camera component 423 may be or may include a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

Camera component 423 may include an infra-red (IR) light component 425, a three-dimensional (3-D) camera 426, and an RGB (visual image) camera 428 that may be used to capture the depth image of a scene. For example, in time-of-flight analysis, the IR light component 425 of the capture device 20 may emit an infrared light onto the scene and may then use sensors (in some embodiments, including sensors not shown) to detect the backscattered light from the surface of one or more targets and objects in the scene using, for example, the 3-D camera 426 and/or the RGB camera 428. In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

In another example embodiment, capture device 20 may use a structured light to capture depth information. In such an analysis, patterned light (i.e., light displayed as a known pattern such as a grid pattern, a stripe pattern, or different pattern) may be projected onto the scene via, for example, the IR light component 425. Upon striking the surface of one or more targets or objects in the scene, the pattern may become deformed in response. Such a deformation of the pattern may be captured by, for example, the 3-D camera 426 and/or the RGB camera 428 (and/or other sensor) and may then be analyzed to determine a physical distance from the capture device to a particular location on the targets or objects. In some implementations, the IR light component 425 is displaced from the cameras 426 and 428 so triangulation can be used to determine distance from cameras 426 and 428. In some implementations, the capture device 20 will include a dedicated IR sensor to sense the IR light, or a sensor with an IR filter.

According to another embodiment, one or more capture devices 20 may include two or more physically separated cameras that may view a scene from different angles to obtain visual stereo data that may be resolved to generate depth information. Other types of depth image sensors can also be used to create a depth image.

The capture device 20 may further include a microphone 430, which includes a transducer or sensor that may receive and convert sound into an electrical signal. Microphone 430 may be used to receive audio signals that may also be provided to hub computing system 12.

In an example embodiment, the capture device 20 may further include a processor 432 that may be in communication with the image camera component 423. Processor 432 may include a standardized processor, a specialized processor, a microprocessor, or the like that may execute instructions including, for example, instructions for receiving a depth image, generating the appropriate data format (e.g., frame) and transmitting the data to hub computing system 12.

Capture device 20 may further include a memory 434 that may store the instructions that are executed by processor 432, images or frames of images captured by the 3-D camera and/or RGB camera, or any other suitable information, images, or the like. According to an example embodiment, memory 434 may include random access memory (RAM), read only memory (ROM), cache, flash memory, a hard disk, or any other suitable storage component. As shown in FIG. 6, in one embodiment, memory 434 may be a separate component in communication with the image camera component 423 and processor 432. According to another embodiment, the memory 434 may be integrated into processor 432 and/or the image camera component 423.

Capture device 20 is in communication with hub computing system 12 via a communication link 436. The communication link 436 may be a wired connection including, for example, a USB connection, a Firewire connection, an Ethernet cable connection, or the like and/or a wireless connection such as a wireless 802.11b, g, a, or n connection. According to one embodiment, hub computing system 12 may provide a clock to capture device 20 that may be used to determine when to capture, for example, a scene via the communication link 436. Additionally, the capture device 20 provides the depth information and visual (e.g., RGB) images captured by, for example, the 3-D camera 426 and/or the RGB camera 428 to hub computing system 12 via the communication link 436. In one embodiment, the depth images and visual images are transmitted at 30 frames per second; however, other frame rates can be used. Hub computing system 12 may then create and use a model, depth information, and captured images to, for example, control an application such as a game or word processor and/or animate an avatar or on-screen character.

Hub computing system 12 includes a skeletal tracking module 450. Module 450 uses the depth images obtained in each frame from capture device 20, and possibly from cameras on the one or more head mounted display devices 2, to develop a representative model of each user 18a, 18b, 18c (or others) within the FOV of capture device 20 as each user moves around in the scene. This representative model may be a skeletal model described below. Hub computing system 12 may further include a scene mapping module 452. Scene mapping module 452 uses depth and possibly RGB image data obtained from capture device 20, and possibly from cameras on the one or more head mounted display devices 2, to develop a map or model of the scene in which the users 18a, 18b, 18c exist. The scene map may further include the positions of the users obtained from the skeletal tracking module 450. The hub computing system may further include a gesture recognition engine 454 for receiving skeletal model data for one or more users in the scene and determining whether the user is performing a predefined gesture or application-control movement affecting an application running on hub computing system 12.

The skeletal tracking module 450 and scene mapping module 452 are explained in greater detail below. More information about gesture recognition engine 454 can be found in U.S. patent application Ser. No. 12/422,661, entitled "Gesture Recognizer System Architecture," filed on Apr. 13, 2009, incorporated herein by reference in its entirety. Additional information about recognizing gestures can also be found in U.S. patent application Ser. No. 12/391,150, entitled "Standard Gestures," filed on Feb. 23, 2009; and U.S. patent application Ser. No. 12/474,655, entitled "Gesture Tool" filed on May 29, 2009, both of which are incorporated herein by reference in their entirety.

In accordance with the present technology, a user may perform various verbal gestures, for example in the form of spoken requests for additional information regarding text in reading materials or images the user is looking at. As one example, the user may speak a word and ask the system to provide a definition of it. Accordingly, the present system further includes a speech recognition engine 456. The speech recognition engine 456 may operate according to any of various known technologies.

Capture device 20 provides RGB images (or visual images in other formats or color spaces) and depth images to hub computing system 12. The depth image may be a plurality of observed pixels where each observed pixel has an observed depth value. For example, the depth image may include a two-dimensional (2-D) pixel area of the captured scene where each pixel in the 2-D pixel area may have a depth value such as the distance of an object in the captured scene from the capture device. Hub computing system 12 will use the RGB images and depth images to develop a skeletal model of a user and to track a user's or other object's movements. There are many methods that can be used to model and track the skeleton of a person with depth images. One suitable example of tracking a skeleton using depth image is provided in U.S. patent application Ser. No. 12/603,437, entitled "Pose Tracking Pipeline" filed on Oct. 21, 2009, (hereinafter referred to as the '437 Application), incorporated herein by reference in its entirety.

The process of the '437 Application includes acquiring a depth image, down sampling the data, removing and/or smoothing high variance noisy data, identifying and removing the background, and assigning each of the foreground pixels to different parts of the body. Based on those steps, the system will fit a model to the data and create a skeleton. The skeleton will include a set of joints and connections between the joints. Other methods for user modeling and tracking can also be used. Suitable tracking technologies are also disclosed in the following four U.S. patent applications, all of which are incorporated herein by reference in their entirety: U.S. patent application Ser. No. 12/475,308, entitled "Device for Identifying and Tracking Multiple Humans Over Time," filed on May 29, 2009; U.S. patent application Ser. No. 12/696,282, entitled "Visual Based Identity Tracking," filed on Jan. 29, 2010; U.S. patent application Ser. No. 12/641,788, entitled "Motion Detection Using Depth Images," filed on Dec. 18, 2009; and U.S. patent application Ser. No. 12/575,388, entitled "Human Tracking System," filed on Oct. 7, 2009.

The above-described hub computing system 12, together with the head mounted display device 2 and processing unit 4, are able to insert a virtual three-dimensional object into the FOV of one or more users so that the virtual three-dimensional object augments and/or replaces the view of the real world. In one embodiment, head mounted display device 2, processing unit 4 and hub computing system 12 work together as each of the devices includes a subset of sensors that are used to obtain the data to determine where, when and how to insert the virtual three-dimensional object. In one embodiment, the calculations that determine where, when and how to insert a virtual three-dimensional object are performed by the hub computing system 12 and processing unit 4 working in tandem with each other. However, in further embodiments, all calculations may be performed by the hub computing system 12 working alone or the processing unit(s) 4 working alone. In other embodiments, at least some of the calculations can be performed by a head mounted display device 2.

In one example embodiment, hub computing system 12 and processing units 4 work together to create the scene map or model of the environment that the one or more users are in and track various moving objects in that environment. In addition, hub computing system 12 and/or processing unit 4 track the FOV of a head mounted display device 2 worn by a user 18a, 18b, 18c by tracking the position and orientation of the head mounted display device 2. Sensor information obtained by head mounted display device 2 is transmitted to processing unit 4. In one example, that information is transmitted to the hub computing system 12 which updates the scene model and transmits it back to the processing unit. The processing unit 4 then uses additional sensor information it receives from head mounted display device 2 to refine the FOV of the user and provide instructions to head mounted display device 2 on where, when and how to insert the virtual three-dimensional object. Based on sensor information from cameras in the capture device 20 and head mounted display device(s) 2, the scene model and the tracking information may be periodically updated between hub computing system 12 and processing unit 4 in a closed loop feedback system as explained below.

Figure 7:
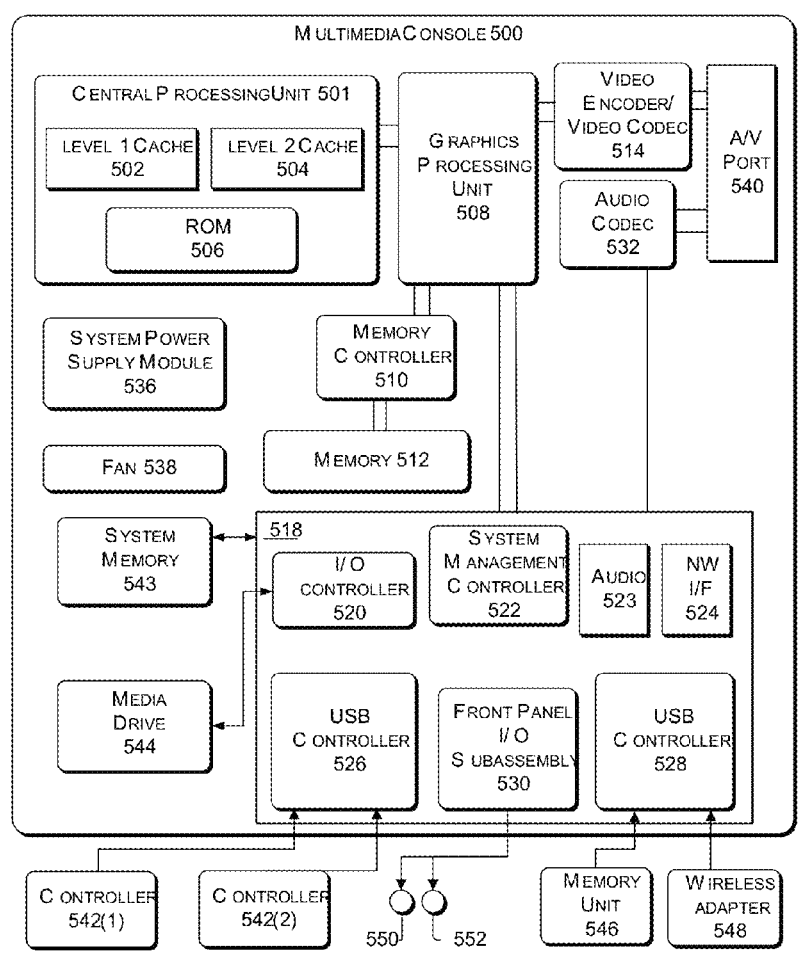
FIG. 7 is a block diagram of one embodiment of a computing system that can be used to implement the hub computing system described herein.

FIG. 7 illustrates an example embodiment of a computing system that may be used to implement hub computing system 12. As shown in FIG. 7, the multimedia console 500 has a central processing unit (CPU) 501 having a level 1 cache 502, a level 2 cache 504, and a flash ROM (Read Only Memory) 506. The level 1 cache 502 and a level 2 cache 504 temporarily store data and hence reduce the number of memory access cycles, thereby improving processing speed and throughput. CPU 501 may be provided having more than one core, and thus, additional level 1 and level 2 caches 502 and 504. The flash ROM 506 may store executable code that is loaded during an initial phase of a boot process when the multimedia console 500 is powered on.

A graphics processing unit (GPU) 508 and a video encoder/video codec (coder/decoder) 514 form a video processing pipeline for high speed and high resolution graphics processing. Data is carried from the graphics processing unit 508 to the video encoder/video codec 514 via a bus. The video processing pipeline outputs data to an A/V (audio/video) port 540 for transmission to a television or other display. A memory controller 510 is connected to the GPU 508 to facilitate processor access to various types of memory 512, such as, but not limited to, a RAM (Random Access Memory).

The multimedia console 500 includes an I/O controller 520, a system management controller 522, an audio processing unit 523, a network interface 524, a first USB host controller 526, a second USB controller 528 and a front panel I/O subassembly 530 that are preferably implemented on a module 518. The USB controllers 526 and 528 serve as hosts for peripheral controllers 542(1)-542(2), a wireless adapter 548, and an external memory device 546 (e.g., flash memory, external CD/DVD ROM drive, removable media, etc.). The network interface 524 and/or wireless adapter 548 provide access to a network (e.g., the Internet, home network, etc.) and may be any of a wide variety of various wired or wireless adapter components including an Ethernet card, a modem, a Bluetooth module, a cable modem, and the like.

System memory 543 is provided to store application data that is loaded during the boot process. A media drive 544 is provided and may comprise a DVD/CD drive, Blu-Ray drive, hard disk drive, or other removable media drive, etc. The media drive 544 may be internal or external to the multimedia console 500. Application data may be accessed via the media drive 544 for execution, playback, etc. by the multimedia console 500. The media drive 544 is connected to the I/O controller 520 via a bus, such as a Serial ATA bus or other high speed connection (e.g., IEEE 1394).

The system management controller 522 provides a variety of service functions related to assuring availability of the multimedia console 500. The audio processing unit 523 and an audio codec 532 form a corresponding audio processing pipeline with high fidelity and stereo processing. Audio data is carried between the audio processing unit 523 and the audio codec 532 via a communication link. The audio processing pipeline outputs data to the A/V port 540 for reproduction by an external audio user or device having audio capabilities.

The front panel I/O subassembly 530 supports the functionality of the power button 550 and the eject button 552, as well as any LEDs (light emitting diodes) or other indicators exposed on the outer surface of the multimedia console 500. A system power supply module 536 provides power to the components of the multimedia console 500. A fan 538 cools the circuitry within the multimedia console 500.

The CPU 501, GPU 508, memory controller 510, and various other components within the multimedia console 500 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 500 is powered on, application data may be loaded from the system memory 543 into memory 512 and/or caches 502, 504 and executed on the CPU 501. The application may present a graphical user interface that provides a consistent user experience when navigating to different media types available on the multimedia console 500. In operation, applications and/or other media contained within the media drive 544 may be launched or played from the media drive 544 to provide additional functionalities to the multimedia console 500.

The multimedia console 500 may be operated as a standalone system by simply connecting the system to a television or other display. In this standalone mode, the multimedia console 500 allows one or more users to interact with the system, watch movies, or listen to music. However, with the integration of broadband connectivity made available through the network interface 524 or the wireless adapter 548, the multimedia console 500 may further be operated as a participant in a larger network community. Additionally, multimedia console 500 can communicate with processing unit 4 via wireless adaptor 548.

When the multimedia console 500 is powered ON, a set amount of hardware resources are reserved for system use by the multimedia console operating system. These resources may include a reservation of memory, CPU and GPU cycle, networking bandwidth, etc. Because these resources are reserved at system boot time, the reserved resources do not exist from the application's view. In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop ups) are displayed by using a GPU interrupt to schedule code to render popup into an overlay. The amount of memory used for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resync is eliminated.

After multimedia console 500 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 501 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Optional input devices (e.g., controllers 542(1) and 542(2)) are shared by gaming applications and system applications. The input devices are not reserved resources, but are to be switched between system applications and the gaming application such that each will have a focus of the device. The application manager preferably controls the switching of input stream, without knowing the gaming application's knowledge and a driver maintains state information regarding focus switches. Capture device 20 may define additional input devices for the console 500 via USB controller 526 or other interface. In other embodiments, hub computing system 12 can be implemented using other hardware architectures. No one hardware architecture is required.

Each of the head mounted display devices 2 and processing units 4 (collectively referred to at times as the mobile display device) shown in FIG. 1 are in communication with one hub computing system 12 (also referred to as the hub 12). There may be one or two or more mobile display devices in communication with the hub 12 in further embodiments. Each of the mobile display devices may communicate with the hub using wireless communication, as described above. In such an embodiment, it is contemplated that much of the information that is useful to the mobile display devices will be computed and stored at the hub and transmitted to each of the mobile display devices. For example, the hub will generate the model of the environment and provide that model to all of the mobile display devices in communication with the hub. Additionally, the hub can track the location and orientation of the mobile display devices and of the moving objects in the room, and then transfer that information to each of the mobile display devices.

In another embodiment, a system could include multiple hubs 12, with each hub including one or more mobile display devices. The hubs can communicate with each other directly or via the Internet (or other networks). Such an embodiment is disclosed in U.S. patent application Ser. No. 12/905,952 to Flaks et al., entitled "Fusing Virtual Content Into Real Content," filed Oct. 15, 2010, which application is incorporated by reference herein in its entirety.

Moreover, in further embodiments, the hub 12 may be omitted altogether. One benefit of such an embodiment is that the mixed reality experience of the present system becomes completely mobile, and may be used in both indoor or outdoor settings. In such an embodiment, all functions performed by the hub 12 in the description that follows may alternatively be performed by one of the processing units 4, some of the processing units 4 working in tandem, or all of the processing units 4 working in tandem. In such an embodiment, the respective mobile display devices 580 perform all functions of system 10, including generating and updating state data, a scene map, each user's view of the scene map, all texture and rendering information, video and audio data, and other information to perform the operations described herein. The embodiments described below with respect to the flowchart of FIG. 9 include a hub 12. However, in each such embodiment, one or more of the processing units 4 may alternatively perform all described functions of the hub 12.

Figure 8A:
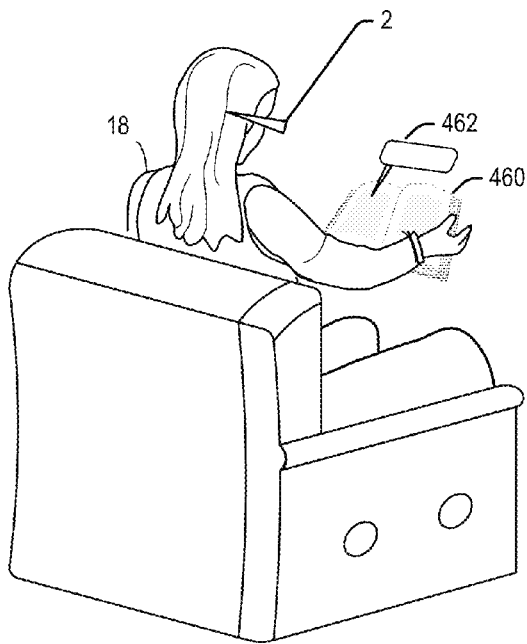
FIGS. 8A and 8B are illustrations of examples of a mixed reality environment including a display of a virtual display slate augmenting a user's experience with reading material.
Figure 8B:
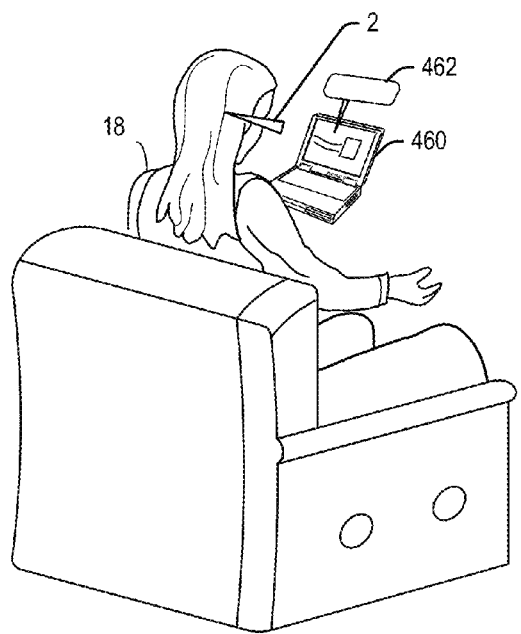

Using the components described above, virtual objects may be displayed to a user 18 via head mounted display device 2 to augment a user's experience with reading material and images. FIG. 8A illustrates a user 18 reading a reading material 460. In the embodiment shown, the reading material may be a tangible reading material such as a physical book. Alternatively, the reading material 460 may be a virtual book displayed to the user via the mixed reality system explained above. FIG. 8B is similar to FIG. 8A, but shows the user 18 interacting with an electronic device providing reading material 460 on a display.

FIGS. 8A and 8B each further show a virtual display slate 462 displayed to the user via the head mounted display 2 in response to a query from the user. A virtual display slate 462 is a virtual screen displayed to the user on which content is presented to the user. The opacity filter 114 is used to mask real world objects and light behind (from the user's view point) the virtual display slate 462, so that the virtual display slate 462 appears to the user as a virtual screen for viewing displayed content. As described below, the displayed content may be text, graphics and/or video provided to the user in response to a query, or generated by the user as a note or metadata associated with a portion of text or an image. A software application running on hub 12 may generate the slate 462, as well as determine the content to be displayed on slate 462, as explained below. It is also understood that more than one virtual display slate 462 may be presented to the user and referenced to different text in reading material 460.

Figure 9:
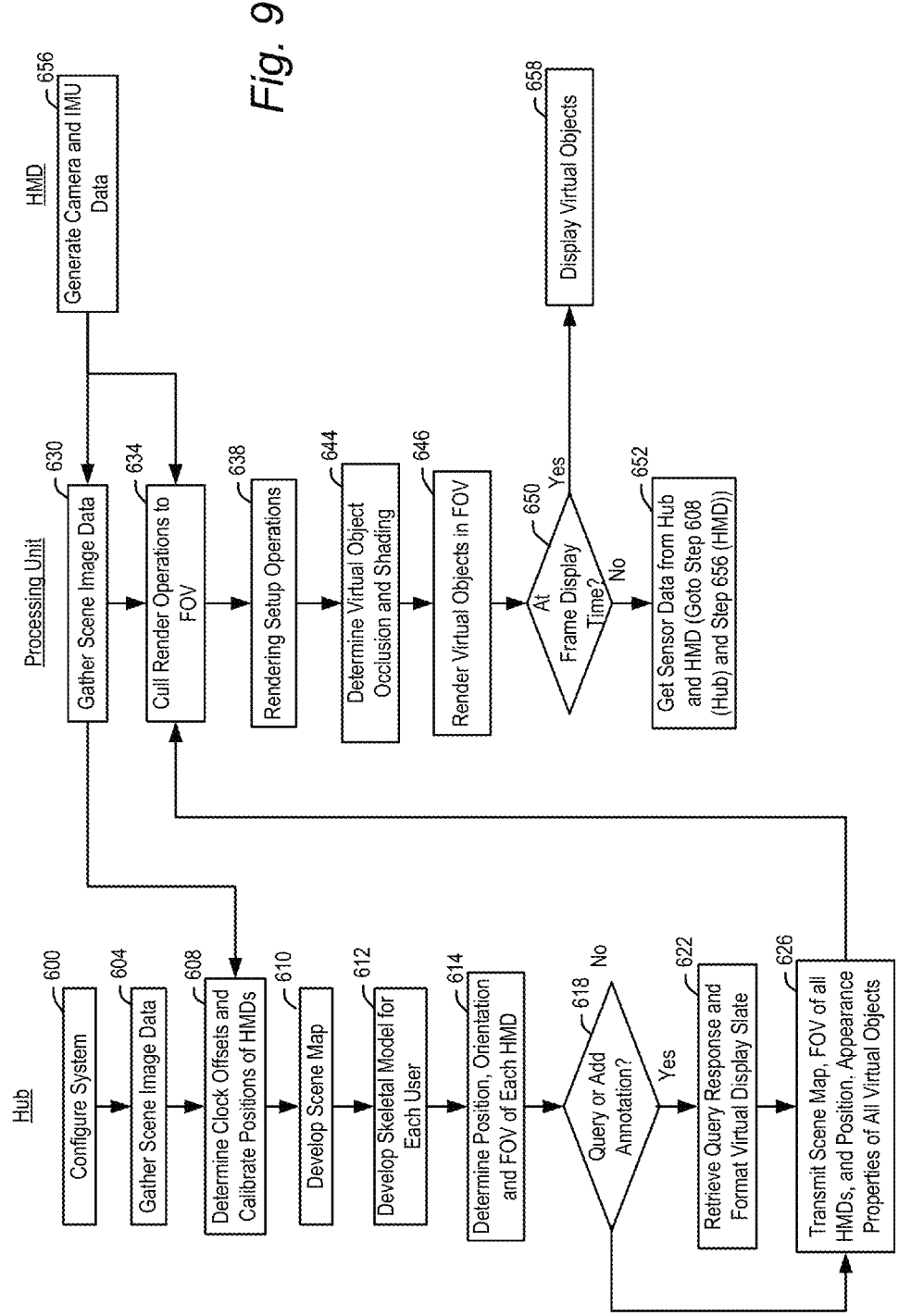
FIG. 9 is a flowchart showing the operation and collaboration of the hub computing system, one or more processing units and one or more head mounted display units of the present system.

FIG. 9 is high level flowchart of the operation and interactivity of the hub computing system 12, the processing unit 4 and head mounted display device 2 during a discrete time period such as the time it takes to generate, render and display a single frame of image data to each user. In embodiments, data may be refreshed at a rate of 60 Hz, though it may be refreshed more often or less often in further embodiments.

In general, the system generates a scene map having x, y, z coordinates of the environment and objects in the environment such as users, real world objects and virtual objects. As noted above, the virtual object such as slate 462 may be virtually placed in the environment for example by an application running on hub computing system 12. The system also tracks the FOV of each user. While all users may possibly be viewing the same aspects of the scene, they are viewing them from different perspectives. Thus, the system generates each person's FOV of the scene to adjust for parallax and occlusion of virtual or real world objects, which may again be different for each user. Where one user, such as user 18 in FIGS. 8A and 8B, generates a virtual display slate 462 in association with a reading material 460, other users may, or may not, be able to view that virtual display slate 462.

For a given frame of image data, a user's view may include one or more real and/or virtual objects. As a user turns his head, for example left to right or up and down, the relative position of real world objects in the user's FOV inherently moves within the user's FOV. For example, plant 23 in FIG. 1 may appear on the right side of a user's FOV at first. But if the user then turns his head toward the right, the plant 23 may eventually end up on the left side of the user's FOV.

However, the display of virtual objects to a user as the user moves his head is a more difficult problem. In an example where a user is looking at a virtual object in his FOV, if the user moves his head left to move the FOV left, the display of the virtual object needs to be shifted to the right by an amount of the user's FOV shift, so that the net effect is that the virtual object remains stationary in three-dimensional space. A system for displaying virtual objects is explained below with respect to the flowcharts of FIGS. 9-14A.

The system for presenting mixed reality to one or more users 18 may be configured in step 600. For example, a user 18 or operator of the system may specify certain virtual objects that are to be presented, and how, when and where they are to be presented. In an alternative embodiment, an application running on hub 12 and/or processing unit 4 can configure the system as to the virtual objects that are to be presented.

In steps 604 and 630, hub 12 and processing unit 4 gather data from the scene. For the hub 12, this may be image and audio data sensed by the depth camera 426, RGB camera 428 and microphone 430 of capture device 20. For the processing unit 4, this may be image data sensed in step 656 by the head mounted display device 2, and in particular, by the cameras 112, the eye tracking assemblies 134 and the IMU 132. The data gathered by the head mounted display device 2 is sent to the processing unit 4 in step 656. The processing unit 4 processes this data, as well as sending it to the hub 12 in step 630.

In step 608, the hub 12 performs various setup operations that allow the hub 12 to coordinate the image data of its capture device 20 and the one or more processing units 4. In particular, even if the position of the capture device 20 is known with respect to a scene (which it may not be), the cameras on the head mounted display devices 2 are moving around in the scene. Therefore, in embodiments, the positions and time capture of each of the imaging cameras need to be calibrated to the scene, each other and the hub 12. Further details of step 608 are now described with reference to the flowchart of FIG. 10.

One operation of step 608 includes determining clock offsets of the various imaging devices in the system 10 in a step 670. In particular, in order to coordinate the image data from each of the cameras in the system, it may be confirmed that the image data being coordinated is from the same time. Details relating to determining clock offsets and synching of image data are disclosed in U.S. patent application Ser. No. 12/772,802, entitled "Heterogeneous Image Sensor Synchronization," filed May 3, 2010, and U.S. patent application Ser. No. 12/792,961, entitled "Synthesis Of Information From Multiple Audiovisual Sources," filed Jun. 3, 2010, which applications are incorporated herein by reference in their entirety. In general, the image data from capture device 20 and the image data coming in from the one or more processing units 4 are time stamped off a single master clock in hub 12. Using the time stamps for all such data for a given frame, as well as the known resolution for each of the cameras, the hub 12 determines the time offsets for each of the imaging cameras in the system. From this, the hub 12 may determine the differences between, and an adjustment to, the images received from each camera.

The hub 12 may select a reference time stamp from one of the cameras' received frame. The hub 12 may then add time to or subtract time from the received image data from all other cameras to synch to the reference time stamp. It is appreciated that a variety of other operations may be used for determining time offsets and/or synchronizing the different cameras together for the calibration process. The determination of time offsets may be performed once, upon initial receipt of image data from all the cameras. Alternatively, it may be performed periodically, such as for example each frame or some number of frames.

Step 608 further includes the operation of calibrating the positions of all cameras with respect to each other in the x, y, z Cartesian space of the scene. Once this information is known, the hub 12 and/or the one or more processing units 4 is able to form a scene map or model identify the geometry of the scene and the geometry and positions of objects (including users) within the scene. In calibrating the image data of all cameras to each other, depth and/or RGB data may be used. Technology for calibrating camera views using RGB information alone is described for example in U.S. Patent Publication No. 2007/0110338, entitled "Navigating Images Using Image Based Geometric Alignment and Object Based Controls," published May 17, 2007, which publication is incorporated herein by reference in its entirety.

The imaging cameras in system 10 may each have some lens distortion which needs to be corrected for in order to calibrate the images from different cameras. Once all image data from the various cameras in the system is received in steps 604 and 630, the image data may be adjusted to account for lens distortion for the various cameras in step 674. The distortion of a given camera (depth or RGB) may be a known property provided by the camera manufacturer. If not, algorithms are known for calculating a camera's distortion, including for example imaging an object of known dimensions such as a checker board pattern at different locations within a camera's FOV. The deviations in the camera view coordinates of points in that image will be the result of camera lens distortion. Once the degree of lens distortion is known, distortion may be corrected by known inverse matrix transformations that result in a uniform camera view map of points in a point cloud for a given camera.

The hub 12 may next translate the distortion-corrected image data points captured by each camera from the camera view to an orthogonal 3-D world view in step 678. This orthogonal 3-D world view is a point cloud map of all image data captured by capture device 20 and the head mounted display device cameras in an orthogonal x, y, z Cartesian coordinate system. The matrix transformation equations for translating camera view to an orthogonal 3-D world view are known. See, for example, David H. Eberly, "3d Game Engine Design: A Practical Approach To Real-Time Computer Graphics," Morgan Kaufman Publishers (2000), which publication is incorporated herein by reference in its entirety. See also, U.S. patent application Ser. No. 12/792,961, previously incorporated by reference.

Each camera in system 10 may construct an orthogonal 3-D world view in step 678. The x, y, z world coordinates of data points from a given camera are still from the perspective of that camera at the conclusion of step 678, and not yet correlated to the x, y, z world coordinates of data points from other cameras in the system 10. The next step is to translate the various orthogonal 3-D world views of the different cameras into a single overall 3-D world view shared by all cameras in system 10.

To accomplish this, embodiments of the hub 12 may next look for key-point discontinuities, or cues, in the point clouds of the world views of the respective cameras in step 682, and then identifies cues that are the same between different point clouds of different cameras in step 684. Once the hub 12 is able to determine that two world views of two different cameras include the same cues, the hub 12 is able to determine the position, orientation and focal length of the two cameras with respect to each other and the cues in step 688. In embodiments, not all cameras in system 10 will share the same common cues. However, as long as a first and second camera have shared cues, and at least one of those cameras has a shared view with a third camera, the hub 12 is able to determine the positions, orientations and focal lengths of the first, second and third cameras relative to each other and a single, overall 3-D world view. The same is true for additional cameras in the system.

Various known algorithms exist for identifying cues from an image point cloud. Such algorithms are set forth for example in Mikolajczyk, K., and Schmid, C., "A Performance Evaluation of Local Descriptors," IEEE Transactions on Pattern Analysis & Machine Intelligence, 27, 10, 1615-1630. (2005), which paper is incorporated by reference herein in its entirety. A further method of detecting cues with image data is the Scale-Invariant Feature Transform (SIFT) algorithm. The SIFT algorithm is described for example in U.S. Pat. No. 6,711,293, entitled, "Method and Apparatus for Identifying Scale Invariant Features in an Image and Use of Same for Locating an Object in an Image," issued Mar. 23, 2004, which patent is incorporated by reference herein in its entirety. Another cue detector method is the Maximally Stable Extremal Regions (MSER) algorithm. The MSER algorithm is described for example in the paper by J. Matas, O. Chum, M.

Urba, and T. Pajdla, "Robust Wide Baseline Stereo From Maximally Stable Extremal Regions," Proc. of British Machine Vision Conference, pages 384-396 (2002), which paper is incorporated by reference herein in its entirety.

In step 684, cues which are shared between point clouds from two or more cameras are identified. Conceptually, where a first set of vectors exist between a first camera and a set of cues in the first camera's Cartesian coordinate system, and a second set of vectors exist between a second camera and that same set of cues in the second camera's Cartesian coordinate system, the two systems may be resolved with respect to each other into a single Cartesian coordinate system including both cameras. A number of known techniques exist for finding shared cues between point clouds from two or more cameras. Such techniques are shown for example in Arya, S., Mount, D. M., Netanyahu, N. S., Silverman, R., and Wu, A. Y., "An Optimal Algorithm For Approximate Nearest Neighbor Searching Fixed Dimensions," Journal of the ACM 45, 6, 891-923 (1998), which paper is incorporated by reference herein in its entirety. Other techniques can be used instead of, or in addition to, the approximate nearest neighbor solution of Arya et al., incorporated above, including but not limited to hashing or context-sensitive hashing.

Where the point clouds from two different cameras share a large enough number of matched cues, a matrix correlating the two point clouds together may be estimated, for example by Random Sampling Consensus (RANSAC), or a variety of other estimation techniques. Matches that are outliers to the recovered fundamental matrix may then be removed. After finding a set of assumed, geometrically consistent matches between a pair of point clouds, the matches may be organized into a set of tracks for the respective point clouds, where a track is a set of mutually matching cues between point clouds. A first track in the set may contain a projection of each common cue in the first point cloud. A second track in the set may contain a projection of each common cue in the second point cloud. The point clouds from different cameras may then be resolved into a single point cloud in a single orthogonal 3-D real world view.

The positions and orientations of all cameras are calibrated with respect to this single point cloud and single orthogonal 3-D real world view. In order to resolve the various point clouds together, the projections of the cues in the set of tracks for two point clouds are analyzed. From these projections, the hub 12 can determine the perspective of a first camera with respect to the cues, and can also determine the perspective of a second camera with respect to the cues. From that, the hub 12 can resolve the point clouds into an estimate of a single point cloud and single orthogonal 3-D real world view containing the cues and other data points from both point clouds.

This process is repeated for any other cameras, until the single orthogonal 3-D real world view includes all cameras. Once this is done, the hub 12 can determine the relative positions and orientations of the cameras relative to the single orthogonal 3-D real world view and each other. The hub 12 can further determine the focal length of each camera with respect to the single orthogonal 3-D real world view.

Referring again to FIG. 9, once the system is calibrated in step 608, a scene map may be developed in step 610 identifying the geometry of the scene as well as the geometry and positions of objects within the scene. In embodiments, the scene map generated in a given frame may include the x, y and z positions of all users, real world objects and virtual objects in the scene. All of this information is obtained during the image data gathering steps 604, 630 and 656 and is calibrated together in step 608.

At least the capture device 20 includes a depth camera for determining the depth of the scene (to the extent it may be bounded by walls, etc.) as well as the depth position of objects within the scene. As explained below, the scene map is used in positioning virtual objects within the scene, as well as displaying virtual three-dimensional objects with the proper occlusion (a virtual three-dimensional object may be occluded, or a virtual three-dimensional object may occlude, a real world object or another virtual three-dimensional object).

The system 10 may include multiple depth image cameras to obtain all of the depth images from a scene, or a single depth image camera, such as for example depth image camera 426 of capture device 20 may be sufficient to capture all depth images from a scene. An analogous method for determining a scene map within an unknown environment is known as simultaneous localization and mapping (SLAM). One example of SLAM is disclosed in U.S. Pat. No. 7,774,158, entitled "Systems and Methods for Landmark Generation for Visual Simultaneous Localization and Mapping," issued Aug. 10, 2010, which patent is incorporated herein by reference in its entirety.

In step 612, the system will detect and track moving objects such as humans moving in the room, and update the scene map based on the positions of moving objects. This includes the use of skeletal models of the users within the scene as described above. In step 614, the hub determines the x, y and z position, the orientation and the FOV of each head mounted display device 2 for all users within the system 10. Further details of step 614 are now described with respect to the flowchart of FIG. 11. The steps of FIG. 11 are described below with respect to a single user. However, the steps of FIG. 11 would be carried out for each user within the scene.

In step 700, the calibrated image data for the scene is analyzed at the hub to determine both the user head position and a face unit vector looking straight out from a user's face. The head position is identified in the skeletal model. The face unit vector may be determined by defining a plane of the user's face from the skeletal model, and taking a vector perpendicular to that plane. This plane may be identified by determining a position of a user's eyes, nose, mouth, ears or other facial features. The face unit vector may be used to define the user's head orientation and, in examples, may be considered the center of the FOV for the user. The face unit vector may also or alternatively be identified from the camera image data returned from the cameras 112 on head mounted display device 2. In particular, based on what the cameras 112 on head mounted display device 2 see, the associated processing unit 4 and/or hub 12 is able to determine the face unit vector representing a user's head orientation.

In step 704, the position and orientation of a user's head may also or alternatively be determined from analysis of the position and orientation of the user's head from an earlier time (either earlier in the frame or from a prior frame), and then using the inertial information from the IMU 132 to update the position and orientation of a user's head. Information from the IMU 132 may provide accurate kinematic data for a user's head, but the IMU typically does not provide absolute position information regarding a user's head. This absolute position information, also referred to as "ground truth," may be provided from the image data obtained from capture device 20, the cameras on the head mounted display device 2 for the subject user and/or from the head mounted display device(s) 2 of other users.

In embodiments, the position and orientation of a user's head may be determined by steps 700 and 704 acting in tandem. In further embodiments, one or the other of steps 700 and 704 may be used to determine head position and orientation of a user's head.

It may happen that a user is not looking straight ahead. Therefore, in addition to identifying user head position and orientation, the hub may further consider the position of the user's eyes in his head. This information may be provided by the eye tracking assembly 134 described above. The eye tracking assembly is able to identify a position of the user's eyes, which can be represented as an eye unit vector showing the left, right, up and/or down deviation from a position where the user's eyes are centered and looking straight ahead (i.e., the face unit vector). A face unit vector may be adjusted to the eye unit vector to define where the user is looking.

In step 710, the FOV of the user may next be determined. The range of view of a user of a head mounted display device 2 may be predefined based on the up, down, left and right peripheral vision of a hypothetical user. In order to ensure that the FOV calculated for a given user includes objects that a particular user may be able to see at the extents of the FOV, this hypothetical user may be taken as one having a maximum possible peripheral vision. Some predetermined extra FOV may be added to this to ensure that enough data is captured for a given user in embodiments.

The FOV for the user at a given instant may then be calculated by taking the range of view and centering it around the face unit vector, adjusted by any deviation of the eye unit vector. In addition to defining what a user is looking at in a given instant, this determination of a user's FOV is also useful for determining what a user cannot see. As explained below, limiting processing of virtual objects to only those areas that a particular user can see improves processing speed and reduces latency.

In the embodiment described above, the hub 12 calculates the FOV of the one or more users in the scene. In further embodiments, the processing unit 4 for a user may share in this task. For example, once user head position and eye orientation are estimated, this information may be sent to the processing unit which can update the position, orientation, etc. based on more recent data as to head position (from IMU 132) and eye position (from eye tracking assembly 134).

Returning now to FIG. 9, in accordance with the present technology, a user may augment an experience with a reading material or image by appending virtual content to the reading material or image. In step 618, the hub 12 checks for a query or annotation from the user. The user may query the system using a variety of predefined physical and/or verbal gestures. A predefined gesture may also indicate a user's desire to add an annotation (note or metadata) to text or an image.

These query and annotation gestures may be associated with a specific section of text or an image, again via a variety of predefined physical and/or verbal gestures. For example, the user may speak the word "define," followed by speaking the word the user wishes to define. Verbal gestures and spoken words may be identified via the speech recognition engine 456 (FIG. 6).

Instead of speaking the word, the system tracks the user's eyes and may be able to determine the specific word the user is looking at. The system may use the user's gaze as the physical gesture indicating the text/image the user wishes additional information on. The user may request a wide variety of information using different predefined gestures. Further examples are provided below.

Once a query or annotation gesture is received in step 618, the system seeks to formulate a response, or add the annotation, and formats a virtual display slate for displaying the response or annotation in step 622. Further details regarding step 622 will now be explained with reference to the flowcharts of FIGS. 12 and 13. The system identified one of a query or annotation gesture in step 618. In step 714, the system determines whether the gesture was a request for information or to add an annotation to text or an image.

If it is determined in step 714 that the user wishes to add an annotation to text, the system next receives the annotation input in step 716. This annotation may typically be spoken and translated to text via the speech recognition engine. Alternatively, the input may be stored as an audio file and associated with the referenced text or image via a virtual display slate. It is conceivable that the system may receive the annotation input by other than verbal methods, such as for example the user entering the input via a keyboard. The keyboard may be virtual, or the keyboard may be a real world object connected to the hub computing device. The input annotation is stored in association with text or an image as explained below.

If it is determined in step 714 that a user wishes to query the system for additional information on text or an image, the system checks in step 718 whether the query for information can be identified. Step 718 checks both whether the system can determine what information is being sought, and whether the system can determine the specific text or image for which information is being sought. If the system cannot identify the query or the text/image on which the query is to be performed, the system can prompt the user to repeat the gesture in step 720. If, after a few attempts, the query cannot be identified, the system can relay that the query cannot be identified.

In further embodiments, a user may define parameters for the search, using additional predefined gestures. For example, the user may specify the media type for the response (e.g., text only, video only or all types of media). Other parameters including but not limited to date range and/or geographical limitations may be input through verbal or physical gestures (including keyboard input).

If, on the other hand, the query can be identified in step 718, the system next attempts to find a response to the query. In step 724, the system can query local memory, such as for example memory within hub computing device 12, in an attempt to identify a response to the query. In embodiments, the reading material or images may have an associated software application, which includes additional, queriable information relating to the reading material or image that the user is experiencing. As one of many examples, a user may be reading a novel with diverse characters and settings. That novel may have an associated software application executing on hub computing system 12 which can provide rich information about characters and storyline in response to queries received via predefined user gestures.

If a response is not found locally (or if a response is found locally, but the user desires still further information), the present system may send the query over a network connection to the World Wide Web. The query may be formulated, and the search performed, in step 726. Certain websites may be designated in a software application running on hub 12, which are to be accessed depending on the type of query received. In embodiments, the hub computing system 12 may contact a designated dictionary website for word definition requests. An example of a dictionary website which may be used is www.merriam-webster.com. In embodiments, the hub 12 may also connect to a designated encyclopedia website for other informational requests about text and images. Such informational websites may return accumulated knowledge on a person, character, place or thing selected in the reading material. An example of an encyclopedia website which may be used is www.wikipedia.com.

A wide variety of other websites may be predefined or designated for use by hub 12 and/or a software application running on hub 12, in seeking responses to certain types of queries. In further embodiments, a user may manually input a website to be contacted by hub 12 to find a response to a query. In the embodiment described above, a response to the query is searched for locally, and then on the World Wide Web. The response may instead be searched for first on the World Wide Web in alternative embodiments. Further, the system may search only one of these sources (locally or over the Web) in another alternative embodiment. If no response is found locally in step 724, or on the World Wide Web in step 728, the system can indicate that no response to the query was found in step 732.

If the user inputs an annotation in step 716, or if a response to a query is found in steps 724 and/or 728, the system next formats the size and position of a virtual display slate in step 734 on which to display the annotation or response. The system is able to determine the outline of the object, such as a book (real or virtual) from its three-dimensional position in space. The system may also be able to determine blank borders surrounding text in a reading material. Using this information, the system can generate, format and position a virtual display slate with responsive information, and tie that virtual display slate to selected text or an image, in step 734. Further details of step 734 will now be explained with reference to the flowchart of FIG. 13.

In steps 742 and 744, the size and position of the virtual display slate are set to a user-defined size and position, or absent that, a default size and position. It may be that the user has already created one or more other virtual display slates which are being displayed to the user. In step 746, the system checks whether the size and position selected in steps 742 and 744 are in conflict (overlap) with another virtual display slate. If so, a position of the new virtual display slate may be changed by user rule or a default set of rules so that the new slate is not placed in an overlapping position with a previous slate.

Depending on the length of content in the response or annotation, the size set in step 744 may or may not be large enough. In step 748, the system checks whether the size of the virtual display slate is large enough. If so, the size and position formatting of the virtual display slate is set, and the flow branches to step 736 in FIG. 12.

On the other hand, if it is determined in step 748 that the selected size is not big enough to contain the response, the system checks in step 750 whether there is space at the current location to increase the size of the virtual display slate. If so, the virtual display slate is enlarged in step 754 and the flow returns to step 748 to see if the virtual display slate is now large enough to accommodate the returned text/image. In embodiments, the virtual display slate may be generally rectangular and its size may be increased along its length and/or height. The virtual display slate may be other shapes in further embodiments.

Steps 748, 750 and 754 may continue to enlarge the virtual display slate at its selected position until it is found in step 748 that the text/image fits, or it is found in step 750 that there is no more room at the current location to enlarge the virtual display slate. There may be no more room at the current location either because it is impinging on the text/image or because it is at an edge of the user's FOV.

If it is determined in step 750 that there is no more space at the current position to enlarge the virtual display slate, the system checks in step 756 whether the virtual display slate may be moved to a new location. As in step 746, the new location may be user-defined or set by a set of default rules. If there is room to move the virtual display slate, the slate is moved in step 758 and the flow returns to step 748 to see if the virtual display slate is now large enough to accommodate the returned text/image.

Steps 748, 750, 754, 756 and 758 may continue to move and enlarge the virtual display slate until it is found in step 748 that the text/image fits, or it is found in steps 750 and 756 that there is no more room to enlarge the virtual display slate. At that point, the virtual display slate may be formatted in step 736 with a scroll bar to fit the content, or the text/image may be made smaller. The flow then branches to step 736 in FIG. 12.

In step 736, the virtual display slate is connected to the selected text or image. As noted above, this location may be determined by the user's gaze at the time of the query or annotation. When displayed to the user as explained below, the virtual display slate may be tied to selected text or an image by a line or arrow as discussed below.

Step 736 further includes the step of pinning the virtual display slate to the reading material/image. The position of the reading material or image 460 may shift within a user's FOV, for example if the user moves his head or the user moves the reading material/image. In embodiments, it is desirable to have the virtual display slate shift with the reading material/image relative to the user's FOV. The position of the reading material is known in three dimensional space, and the position of the virtual display slate(s) are known in three dimensional space. Thus, the hub 12 may move the position of the virtual display slate(s) each frame to pin them to the reading material or image as it moves within a user's FOV.

In addition to pinning, the size of the virtual display slate, and the content displayed therein, may get bigger or smaller as the distance of the reading material from the user changes. For example, if the user brings the reading material closer to his eyes to make the print larger and clearer, the virtual display slate and content therein may be altered to be correspondingly larger. Altering the size of the virtual display slate with a change in reading material distance may be omitted in further embodiments.

In a final step 738 in FIG. 12, the content, size and position of the virtual display slate relative to the reading material may be saved, so that it may be accessed again at a later time. This step may be omitted with respect to a response to a query, with respect to an annotation, or both in further embodiments.

Figure 12:
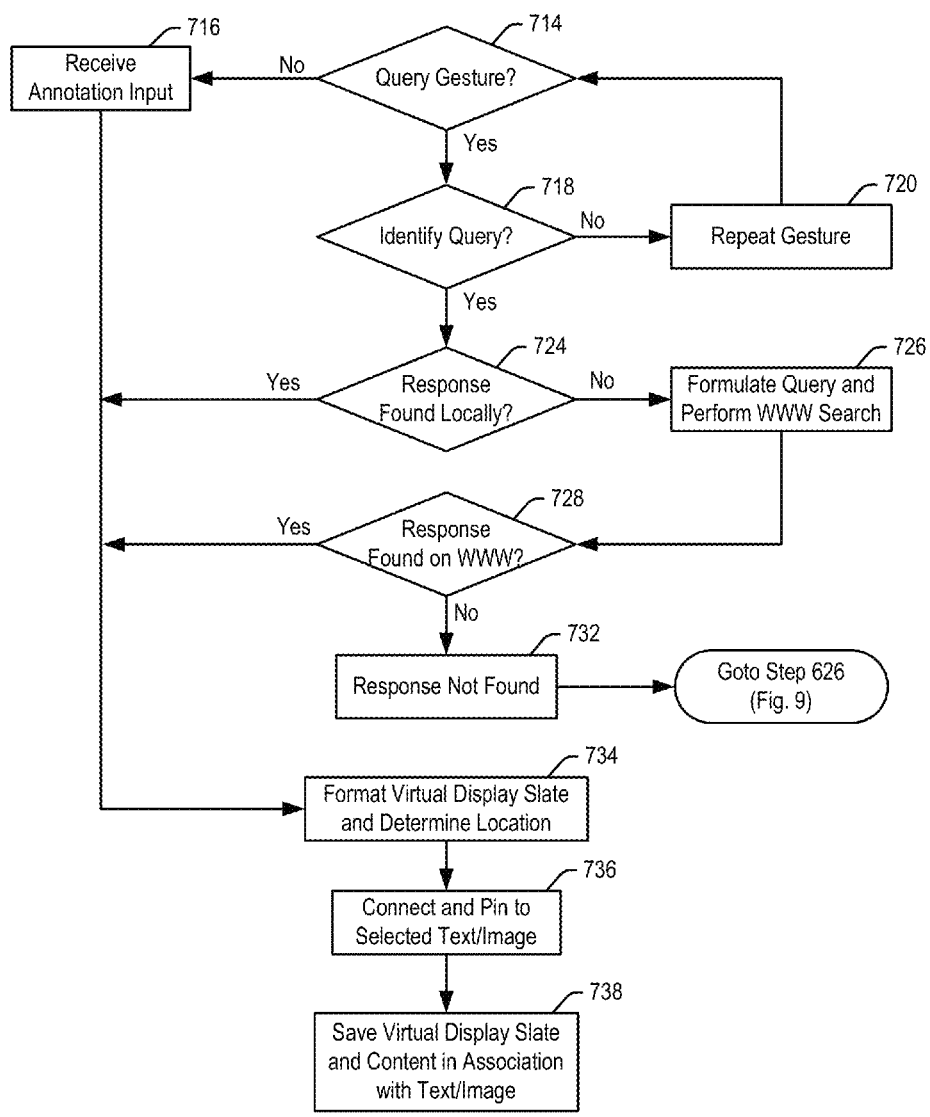
Figure 13:
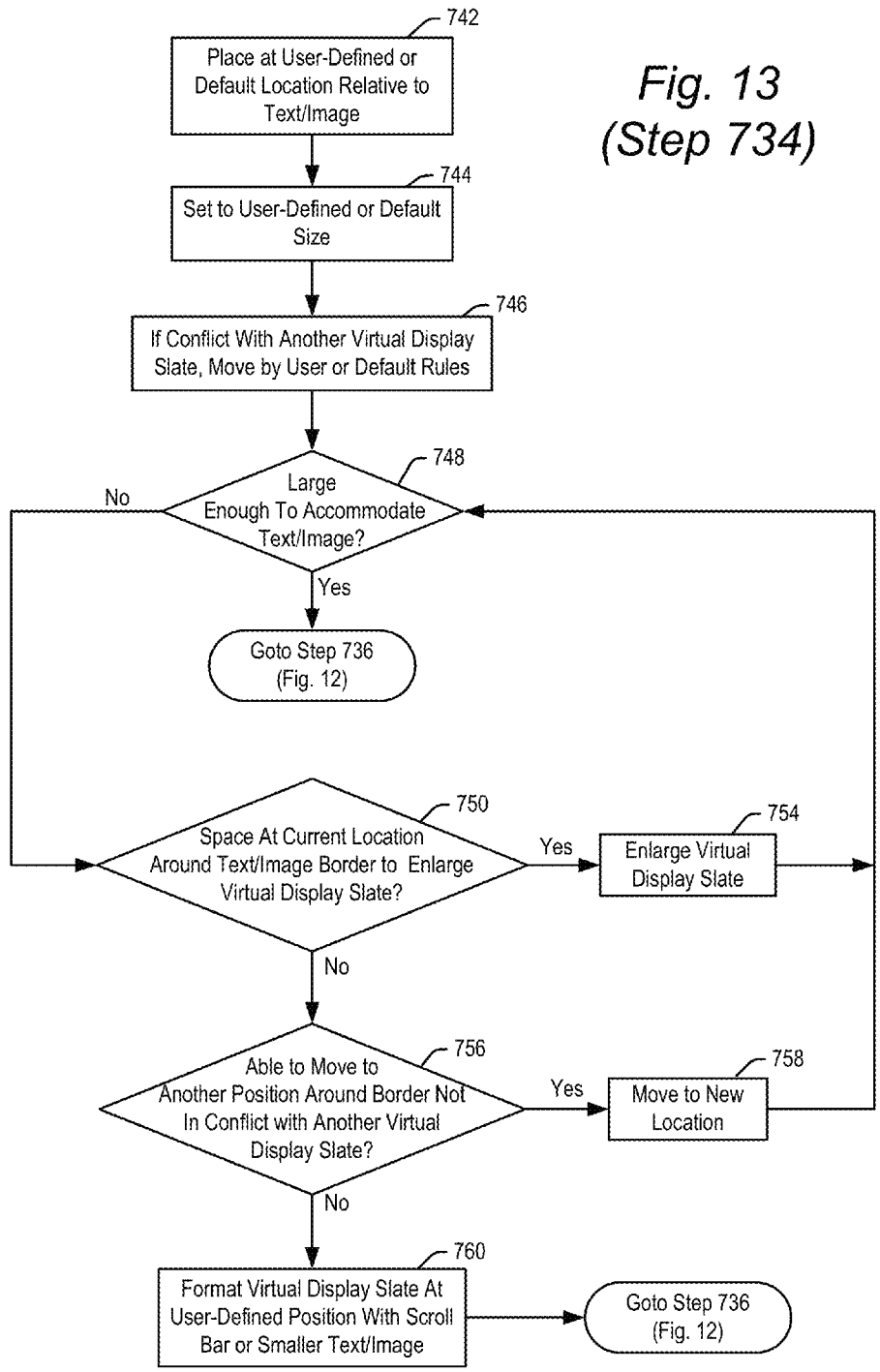

Once the virtual display slate with the response or annotation is set as described in FIGS. 12 and 13, the hub 12 may transmit the determined information to the one or more processing units 4 in step 626 (FIG. 9). The information transmitted in step 626 includes transmission of the scene map to the processing units 4 of all users. The transmitted information may further include transmission of the determined FOV of each head mounted display device 2 to the processing units 4 of the respective head mounted display devices 2. The transmitted information may further include transmission of virtual object characteristics, including the determined content, size and position.

The processing steps 600 through 626 are described above by way of example only. It is understood that one or more of these steps may be omitted in further embodiments, the steps may be performed in differing order, or additional steps may be added. The processing steps 604 through 622 may be computationally expensive but the powerful hub 12 may perform these steps several times in a 60 Hertz frame. In further embodiments, one or more of the steps 604 through 622 may alternatively or additionally be performed by one or more of the one or more processing units 4. Moreover, while FIG. 9 shows determination of various parameters, and then transmission of these parameters all at once in step 626, it is understood that determined parameters may be sent to the processing unit(s) 4 asynchronously as soon as they are determined.

The operation of the processing unit 4 and head mounted display device 2 will now be explained with reference to steps 630 through 656. The following description is of a single processing unit 4 and head mounted display device 2. However, the following description may apply to each processing unit 4 and display device 2 in the system.

As noted above, in an initial step 656, the head mounted display device 2 generates image and IMU data, which is sent to the hub 12 via the processing unit 4 in step 630. While the hub 12 is processing the image data, the processing unit 4 is also processing the image data, as well as performing steps in preparation for rendering an image.

In step 634, the processing unit 4 may cull the rendering operations so that only those virtual objects which could possibly appear within the final FOV of the head mounted display device 2 are rendered. The positions of other virtual objects may still be tracked, but they are not rendered. It is also conceivable that, in further embodiments, step 634 may be skipped altogether and the entire image is rendered.

The processing unit 4 may next perform a rendering setup step 638 where setup rendering operations are performed using the scene map and FOV received in step 626. Once virtual object data is received, the processing unit may perform rendering setup operations in step 638 for the virtual objects which are to be rendered in the FOV. The setup rendering operations in step 638 may include common rendering tasks associated with the virtual object(s) to be displayed in the final FOV. These rendering tasks may include for example, shadow map generation, lighting, and animation. In embodiments, the rendering setup step 638 may further include a compilation of likely draw information such as vertex buffers, textures and states for virtual objects to be displayed in the final FOV.

Using the information received from the hub 12 in step 626, the processing unit 4 may next determine occlusions and shading in the user's FOV in step 644. In particular, the screen map has x, y and z positions of all objects in the scene, including moving and non-moving objects and the virtual objects. Knowing the location of a user and their line of sight to objects in the FOV, the processing unit 4 may then determine whether a virtual object partially or fully occludes the user's view of a real world object. Additionally, the processing unit 4 may determine whether a real world object partially or fully occludes the user's view of a virtual object. Occlusions are user-specific. A virtual object may block or be blocked in the view of a first user, but not a second user. Accordingly, occlusion determinations may be performed in the processing unit 4 of each user. However, it is understood that occlusion determinations may additionally or alternatively be performed by the hub 12.

In the context of the present technology, the processing unit 4 checks in step 644 whether a repositioned virtual object such as a slate 462 occludes or is occluded by another object. As noted above and explained below, the opacity filter 114 allows slate 462 to be displayed while blocking light from virtual and real world object that appear behind the slate 462 (from the user's point of view). The slate 462 may be occluded by object appearing closer to the user that slate 462. In that case, the user may do nothing (and leave the slate 462 occluded), or the user may reposition the slate 462 in front of the occluding object. In this instance, the slate 462 may be made smaller to maintain the same perspective of the slate 462 to the user.

Figure 14:
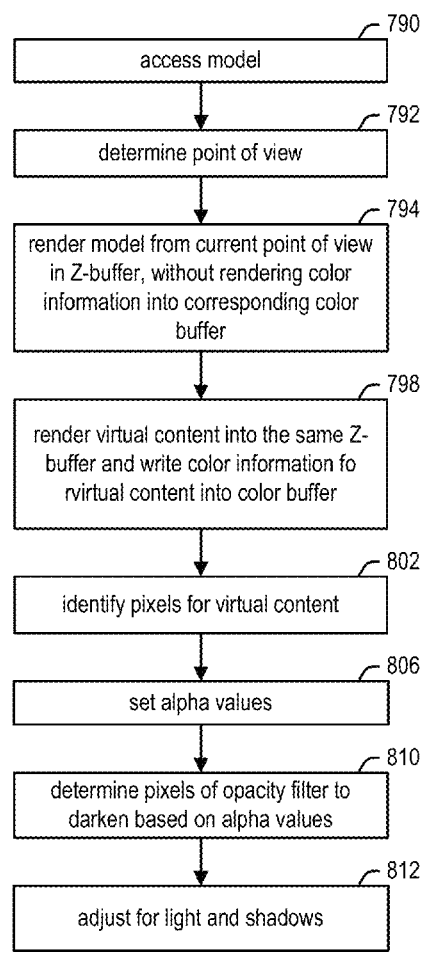
Figure 14A:
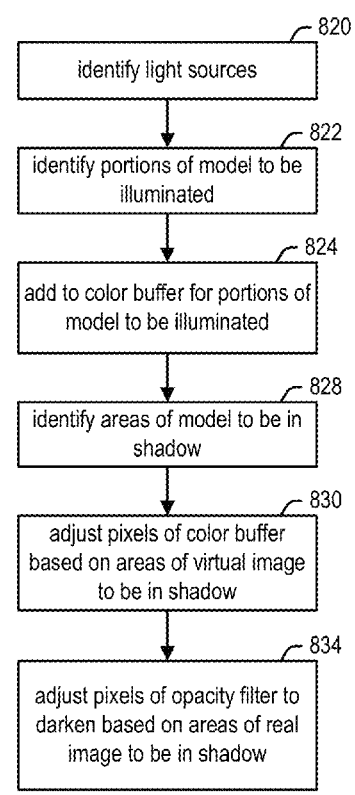

In step 646, the GPU 322 of processing unit 4 may next render an image to be displayed to the user. Portions of the rendering operations may have already been performed in the rendering setup step 638 and periodically updated. Further details of the rendering step 646 are now described with reference to the flowchart of FIGS. 14 and 14A. FIGS. 14 and 14A are described with respect to an example of rendering a virtual display slate 462, though the following steps apply to rending all virtual objects.

In step 790 of FIG. 14, the processing unit 4 accesses the model of the environment. In step 792, the processing unit 4 determines the point of view of the user with respect to the model of the environment. That is, the system determines what portion of the environment or space the user is looking at. In one embodiment, step 792 is a collaborative effort using hub computing device 12, processing unit 4 and head mounted display device 2 as described above.

In one embodiment, the processing unit 4 will attempt to add one or more virtual display slates 462 into a scene. In step 794, the system renders the previously created three dimensional model of the environment from the point of view of the user of head mounted display device 2 in a z-buffer, without rendering any color information into the corresponding color buffer. This effectively leaves the rendered image of the environment to be all black, but does store the z (depth) data for the objects in the environment. Step 794 results in a depth value being stored for each pixel (or for a subset of pixels).

In step 798, virtual content (e.g., virtual images corresponding to the virtual display slates 462) is rendered into the same z-buffer and the color information for the virtual content is written into the corresponding color buffer. This effectively allows the virtual display slates 462 to be drawn on the headset microdisplay 120 taking into account real world objects or other virtual objects occluding all or part of a virtual display slate.

In step 802, the system identifies the pixels of microdisplay 120 that display virtual display slates. In step 806, alpha values are determined for the pixels of microdisplay 120. In traditional chroma key systems, the alpha value is used to identify how opaque an image is, on a pixel-by-pixel basis. In some applications, the alpha value can be binary (e.g., on or off). In other applications, the alpha value can be a number with a range. In one example, each pixel identified in step 802 will have a first alpha value and all other pixels will have a second alpha value.

In step 810, the pixels for the opacity filter 114 are determined based on the alpha values. In one example, the opacity filter 114 has the same resolution as microdisplay 120 and, therefore, the opacity filter can be controlled using the alpha values. In another embodiment, the opacity filter has a different resolution than microdisplay 120 and, therefore, the data used to darken or not darken the opacity filter will be derived from the alpha value by using any of various mathematical algorithms for converting between resolutions. Other means for deriving the control data for the opacity filter based on the alpha values (or other data) can also be used.

In step 812, the images in the z-buffer and color buffer, as well as the alpha values and the control data for the opacity filter, are adjusted to account for light sources (virtual or real) and shadows (virtual or real). More details of step 812 are provided with respect to FIG. 14A. FIG. 14A is a flowchart describing one embodiment of a process for accounting for light sources and shadows. In step 820, processing unit 4 identifies one or more light sources that need to be accounted for. For example, a real light source may need to be accounted for when drawing a virtual image. If the system is adding a virtual light source to the user's view, then the effect of that virtual light source can be accounted for in the head mounted display device 2 as well. In step 822, the portions of the model (including virtual objects) that are illuminated by the light source are identified. In step 824, an image depicting the illumination is added to the color buffer described above.

In step 828, processing unit 4 identifies one or more areas of shadow that need to be added by the head mounted display device 2. For example, if a virtual object is added to an area in a shadow, then the shadow needs to be accounted for when drawing the virtual object by adjusting the color buffer in step 830. If a virtual shadow is to be added where there is no virtual object, then the pixels of opacity filter 114 that correspond to the location of the virtual shadow are darkened in step 834.

In conjunction with a rendered image, the hub computing system may also provide audio over the speakers 22 (FIG. 1). The audio may be associated with a scene in general. Alternatively or additionally, the audio may be associated with a specific virtual object. Where associated with a specific virtual object, the audio may have a directional component. Thus, where two users are viewing a virtual object having associated audio, the object being to the left of a first user and to the right of the second user, the corresponding audio will appear to come from the left of the first user and to the right of the second user. This effect may be generated by spatially separated speakers 22. While FIG. 1 shows two speakers 22, there may be more than two speakers in further embodiments.

Returning to FIG. 9, in step 650, the processing unit checks whether it is time to send a rendered image to the head mounted display device 2, or whether there is still time for further refinement of the image using more recent position feedback data from the hub 12 and/or head mounted display device 2. In a system using a 60 Hertz frame refresh rate, a single frame is about 16 ms.

In particular, the composite image based on the z-buffer and color buffer (described above with respect to FIGS. 14 and 14A) is sent to microdisplay 120. That is, the images for the one or more virtual display slates 462 are sent to microdisplay 120 to be displayed at the appropriate pixels, accounting for perspective and occlusions. At this time, the control data for the opacity filter is also transmitted from processing unit 4 to head mounted display device 2 to control opacity filter 114. The head mounted display would then display the image to the user in step 658.

On the other hand, where it is not yet time to send a frame of image data to be displayed in step 650, the processing unit may loop back for more updated data to further refine the predictions of the final FOV and the final positions of objects in the FOV. In particular, if there is still time in step 650, the processing unit 4 may return to step 608 to get more recent sensor data from the hub 12, and may return to step 656 to get more recent sensor data from the head mounted display device 2.

The processing steps 630 through 652 are described above by way of example only. It is understood that one or more of these steps may be omitted in further embodiments, the steps may be performed in differing order, or additional steps may be added.

Moreover, the flowchart of the processor unit steps in FIG. 9 shows all data from the hub 12 and head mounted display device 2 being cyclically provided to the processing unit 4 at the single step 634. However, it is understood that the processing unit 4 may receive data updates from the different sensors of the hub 12 and head mounted display device 2 asynchronously at different times. The head mounted display device 2 provides image data from cameras 112 and inertial data from IMU 132. Sampling of data from these sensors may occur at different rates and may be sent to the processing unit 4 at different times. Similarly, processed data from the hub 12 may be sent to the processing unit 4 at a time and with a periodicity that is different than data from both the cameras 112 and IMU 132. In general, the processing unit 4 may asynchronously receive updated data multiple times from the hub 12 and head mounted display device 2 during a frame. As the processing unit cycles through its steps, it uses the most recent data it has received when extrapolating the final predictions of FOV and object positions.

Figure 15:
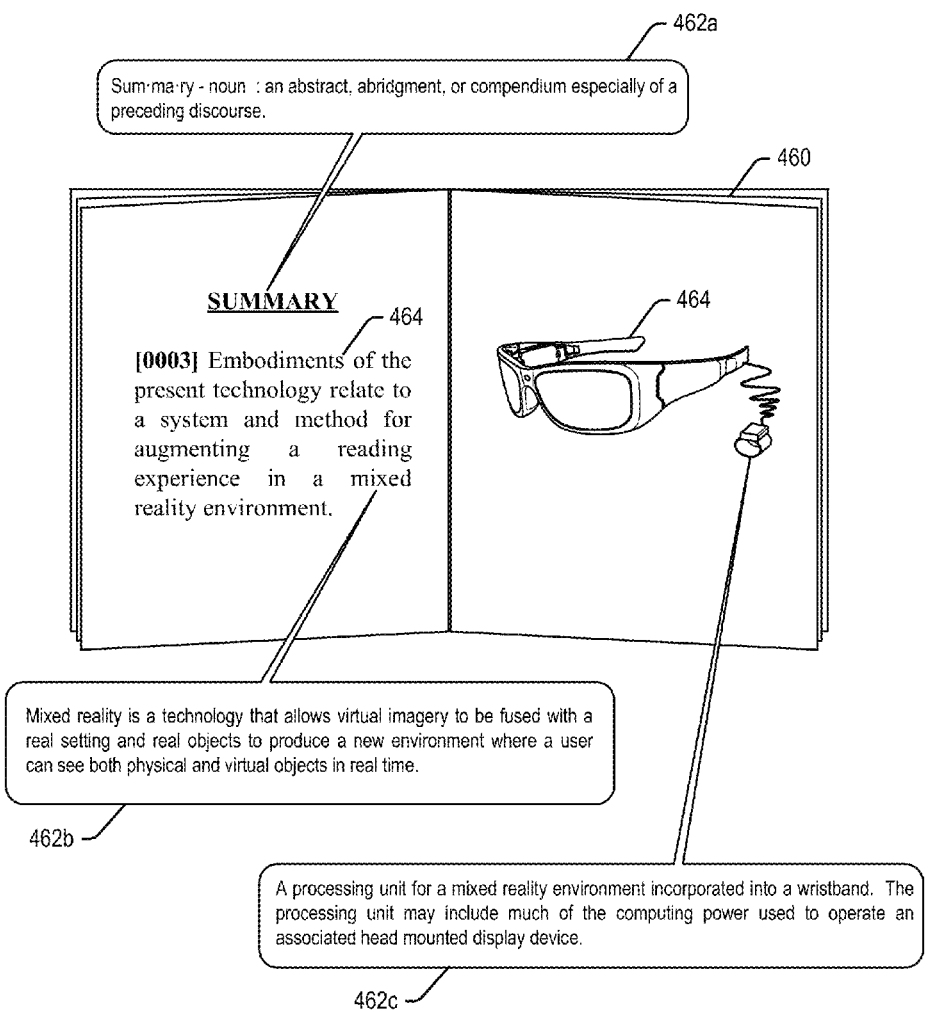
FIGS. 15 and 16 show illustrations of examples of a mixed reality environment including a display of virtual display slates augmenting a book that the user is reading.

FIG. 15 shows a mixed reality environment as may be viewed through a head mounted display 2 including reading material 460. Reading material 460 includes content 464 with both text and an image. In this example, the user has created three virtual display slates 462a, 462b and 462c. In virtual display slate 462a, the user has requested a definition of the term "summary," for example by speaking, "define: summary." In virtual display slate 462b, the user has requested more information on the term "mixed reality," for example by speaking, "what is: mixed reality." The system has generated the virtual display slates 462a and 462b in response as explained above.

In the examples shown, the virtual display slates are affixed to specific text. In further examples, a virtual display slate may be affixed more generally to a text passage, a chapter or a book as a whole, for example on the cover of the book. When affixed to specific text or an image on a page, the virtual display slate may automatically disappear when the user turns to a new page. The virtual display slate may or may not reappear upon going back to that page.

In virtual display slate 462c, the user has requested additional information on an image, which in this example is a mixed reality processing unit as described herein on a wristband. The query could have been generated for example by speaking, "what is," and gazing or pointing at the processing unit shown in the image. In further examples, the image could be a person or a character. Upon selecting the person or character, the system can perform image recognition techniques, and the virtual display screen can return biographical information on the person or character.

Figure 16:
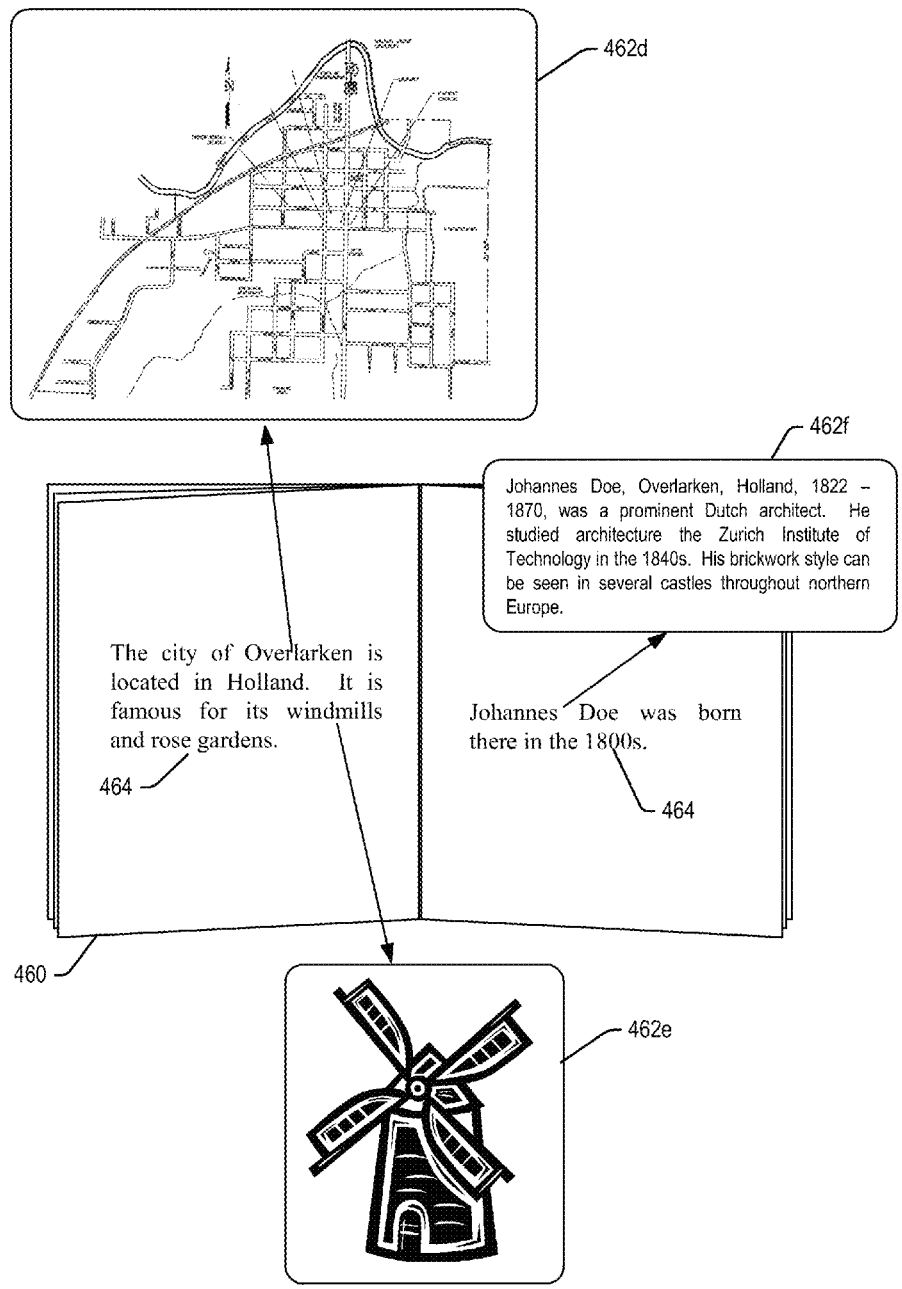

As noted above, virtual display slates may be generated including a variety of information in addition to, or instead of, text. FIG. 16 shows a mixed reality environment seen through a head mounted display 2 including reading material 460 having fictional content 464. In virtual display slate 462d, the user requested a map of a town named in the content 464, for example by looking or pointing at the town name and saying, "map." The map could be static or interactive in embodiments.

The map shown in slate 462d is a geographic map, but other types of maps are contemplated in further examples. For example, the map could be a map of people or character relationships and hierarchy in a story. With regard to an example where reading material 460 is a book, a user can generate a virtual display slate with a map or text giving a synopsis of the story. The system is able to identify how far along the user is in the story (based on the selected text), and provide a synopsis of the story to that point, without giving away later plot details.

In virtual display slate 462e, the user requested a picture, for example by saying "picture of: windmill," or pointing at the word "windmill" in the text. As a further example, in virtual display slate 462f, the user has requested information about a person mentioned in the text of content 464, for example by selecting a name in the text and speaking a verbal gesture such as "who." The person could be real, or could be a character in a fictional work.

Virtual display slate 462f shows an example where the slate is positioned partially over the blank borders of reading material 460, and partially around the border of the reading material 460. As noted above, a virtual display slate may be positioned by user-defined preferences, default preferences stored in hub 12, and/or thereafter moved if a conflict with an existing virtual display slate exists.

Moreover, once a virtual display slate 462 is displayed, a user may thereafter move, resize or close the slate. For example, a user may select one or more of the slates 462 by performing a grabbing or pointing gesture with his hand, or a user may stare at the slate 462. Thereafter, the user 18 may close the slate 462, move the slate 462 within the user's FOV or outside of the user's FOV.

Figure 17:
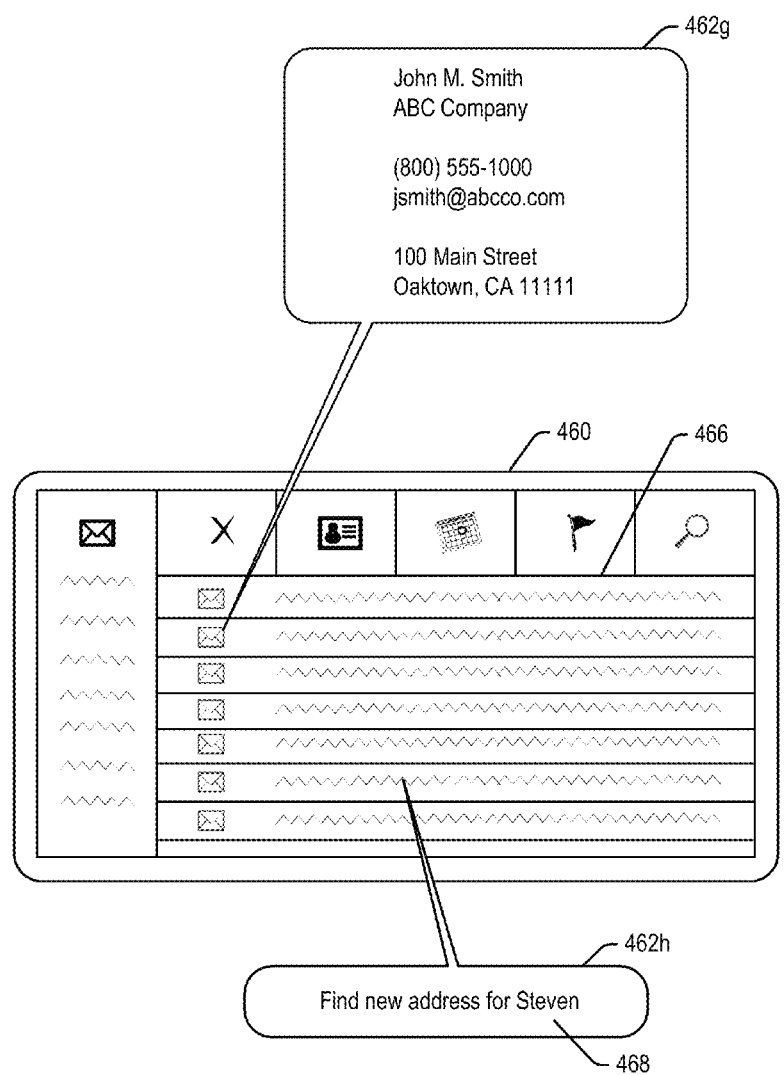

FIG. 17 illustrates a further example of a view through head mounted display 2, where the reading material is a computing device with a display 466. The display 466 is displaying a user interface from an email application, but the display 466 can display any of a wide variety of other content, including an EBook. In virtual display slate 462g, the user has requested to view a contact, for example by a verbal gesture, "view contact: John Smith." Alternatively, display 466 may be a touch screen, so that the user could generate the virtual display slate 462g by the user saying "view contact," combined with the user selecting text using the touch screen. Without the virtual display slate, contact information would be available to the user by navigating to a new display screen. However, the present technology provides the advantage that the user can access additional information without having to navigate away from the screen they are viewing.

FIG. 17 shows a further example of a virtual display slate 462h including an annotation 468. The user has selected a portion of text in display 466, either by pointing or gazing at the text, and has added a note to "find new address for Steven." Metadata may alternatively or additionally be added, such as for example a picture or other information about a selected contact or person. In further examples, a user may attach an annotation including a data file or an executable software application. In a further example, a user may attach a soundtrack to augment a reading material, where the sound track is coordinated with events occurring in the reading material.

In embodiments described above, the virtual display slates are added by a user. In alternative embodiments, a reading material/image may be provided for use with a mixed reality system as described above so as to include predefined, embedded virtual display slates. The embedded virtual display slates may be included in a software application running on the hub computing device 12 by an author of the software application. These embedded virtual display slates could provide any desired information to augment the reading material, including for example text, images, video or interactive displays. These embedded virtual display slates may be tied to specific sections, so that they appear when the user reaches those sections. Alternatively, the embedded virtual display slates may be displayed whenever the user is viewing the reading material or image to augment the user's experience. One example is providing an embedded soundtrack as mentioned above that is coordinated with events in the reading material as a user progresses through the reading material.

In embodiments described above, virtual display slates augmenting reading material and images may be unique to a single user, so that other users in the scene would not see the generated virtual display slates. In further embodiments, for example where a book is being read to a group of people, each of the people may have a head mounted display 2 so that everyone can see the same virtual display slates augmenting the material.

In embodiments described above, a virtual display slate was generated and associated with text in a reading material or an image. In further embodiments, it is understood that a user may request information on objects (read or virtual) that are not reading material or images. Such information may be retrieved from local memory, for example from a software application running on hub 12 including information about real or virtual objects in the user's FOV, or from the World Wide Web. Once responsive information is obtained, the information may be displayed in association with the object as explained above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A method of presenting a mixed reality experience to a user viewing a reading material including at least one of text and an image, the method comprising:
   (a) identifying a position of the reading material in three-dimensional space;
   (b) tracking a position of a user's eyes with respect to text or images in the reading material;
   (c) receiving a request for information regarding a portion of the reading material;
   (d) searching for a response to the request for information received in said step (c);
   (e) displaying the response to a user, if found in said step (d), in a first virtual display slate at a position in the user's field of view that does not overlap with text and/or images from the reading material;
   (f) pinning the position of the virtual display slate in a fixed position with respect to the reading material in the user's field of view; and
   (g) displaying a second virtual display slate to the user, the second virtual display slate included by an author of a software application relating to the reading material, the software application executing on a computing system associated with the mixed reality environment, the second virtual display slate displaying additional information about a portion of the reading material when the user reaches the portion of the reading material.

2. The method of claim 1, wherein the response displayed in said step (e) is one of text, an image and a video.

3. The method of claim 1, further comprising adding a third virtual image in relation to reading material including an annotation with user-defined content.

4. The method of claim 3, wherein the annotation is one of text, an image, a video, a data file, and audio file and an executable software application file.

5. The method of claim 1, wherein the reading material or image is one of a tangible reading material or image, an electronic reading material or image, or a virtual reading material or image.

6. The method recited in claim 1, wherein said step (c) of receiving a request for information comprises the step of receiving one of a plurality of predefined gestures associated with specific requests for information.

7. The method recited in claim 6, wherein the plurality of predefined gestures are at least one of physical gestures and verbal gestures.

8. The method recited in claim 6, wherein the plurality of predefined gestures are gestures for requesting at least one of: i) a definition of selected text, ii) accumulated knowledge on a person, character, place or thing selected in the reading material, iii) a map of a place mentioned in the reading material, iv) a map of relations between people or characters from the reading material, and v) a graphical representation of a person, character, place or thing recited in the text.

9. The method recited in claim 1, wherein said step (c) of receiving a request for information regarding a portion of the reading material comprises the step of receiving one of a plurality of predefined gestures for identifying the portion of reading material on which information is sought.

10. The method recited in claim 9, wherein the plurality of predefined gestures for identifying the portion of reading material including at least one of: i) pointing at the portion of reading material, ii) gazing at the portion of reading material, iii) speaking the portion of reading material, and iv) touching a display screen to highlight the portion of reading material.

11. The method recited in claim 1, wherein said step (d) of searching for a response to the request for information includes the step of searching for a response in a memory of a computing device assisting in the presentation of the mixed reality experience.

12. The method recited in claim 11, further comprising the step of executing a software application on the computing device, the software application including queriable information relating to the reading material.

13. The method recited in claim 1, wherein said step (d) of searching for a response to the request for information includes the step of searching for a response at a designated website accessible via a network connection.

14. The method recited in claim 1, wherein response displayed in said step (e) includes one of: i) a definition of selected text, ii) accumulated knowledge on a person, character, place or thing selected in the reading material, iii) a map of a place mentioned in the reading material, iv) a map of relations between people or characters from the reading material, v) a graphical representation of a person, character, place or thing recited in the text, vi) a synopsis of a story set forth in the reading material, the synopsis not including subject matter from the story set forth in the story after a point of the selected text.

* * * * *